United States Patent
Smith et al.

(10) Patent No.: US 10,957,967 B2
(45) Date of Patent: Mar. 23, 2021

(54) SUPPORT STRUCTURES FOR TRANSPORTATION SYSTEMS

(71) Applicants: AECOM, Los Angeles, CA (US); Robert John Bradley, Swindon (GB)

(72) Inventors: Daniel Smith, Swindon (GB); Neil Sampson, Swindon (GB); Sebastien Perrotin, Swindon (GB); David Munyaka, Swindon (GB); Liam Thomas, Swindon (GB); Robert John Bradley, Swindon (GB)

(73) Assignee: AECOM, Los Angeles, CA (US)

( * ) Notice: Subject to any disclaimer, the term of this patent is extended or adjusted under 35 U.S.C. 154(b) by 0 days.

(21) Appl. No.: 16/054,622

(22) Filed: Aug. 3, 2018

(65) Prior Publication Data

US 2019/0296419 A1      Sep. 26, 2019

Related U.S. Application Data

(60) Provisional application No. 62/646,300, filed on Mar. 21, 2018.

(51) Int. Cl.
| | | |
|---|---|---|
| *H01Q 1/20* | (2006.01) | |
| *H01Q 1/12* | (2006.01) | |
| *B61L 15/00* | (2006.01) | |
| *H01Q 1/24* | (2006.01) | |
| *B61L 3/12* | (2006.01) | |
| *B61L 5/20* | (2006.01) | |

(52) U.S. Cl.
CPC ............ *H01Q 1/1242* (2013.01); *B61L 3/126* (2013.01); *B61L 5/203* (2013.01); *B61L 15/0027* (2013.01); *H01Q 1/20* (2013.01); *H01Q 1/246* (2013.01)

(58) Field of Classification Search
CPC ....... H01Q 1/1235; H01Q 1/1242; H01Q 1/08
USPC ......... 455/562.1; 343/761, 840, 882; 100/43
See application file for complete search history.

(56) References Cited

U.S. PATENT DOCUMENTS

| | | |
|---|---|---|
| 3,909,993 A | 10/1975 | Huddle |
| 5,533,304 A | 7/1996 | Noble |
| 5,534,289 A | 7/1996 | Bilder et al. |
| 5,649,402 A | 7/1997 | Moore |
| 6,082,075 A | 7/2000 | Rysgaard |
| 6,401,285 B1 | 6/2002 | Morris |

(Continued)

FOREIGN PATENT DOCUMENTS

| | | |
|---|---|---|
| JP | 2009-144362 | 7/2009 |
| WO | WO 2007/003879 A1 | 1/2007 |

OTHER PUBLICATIONS

International Search Report and Written Opinion dated Jul. 5, 2019, International Application No. PCT/US2019/023257, 15 pages.

*Primary Examiner* — Sam Bhattacharya
(74) *Attorney, Agent, or Firm* — Knobbe, Martens, Olson & Bear LLP

(57) ABSTRACT

Various embodiments disclosed herein relate to support structures for transportation systems. In some embodiments, the support structure comprises a self-supporting arch assembly. The self-supporting arch assembly can be configured to support one or more devices in a transportation system, such as an antenna assembly configured to communicate with a train. In other embodiments, the support structure can comprise a hinged mast assembly comprising a hinge assembly and mast coupled to the hinge assembly. A device, such as an antenna assembly can be disposed at a distal portion of the mast.

24 Claims, 30 Drawing Sheets

(56) References Cited

U.S. PATENT DOCUMENTS

| | | | |
|---|---|---|---|
| 6,402,403 B1 | 6/2002 | Speakman | |
| 7,811,666 B2 | 10/2010 | Dry | |
| 8,846,404 B2 | 9/2014 | Odom et al. | |
| 8,846,406 B1 | 9/2014 | Martin et al. | |
| 9,303,171 B2 | 4/2016 | Virtanen | |
| 2002/0149536 A1* | 10/2002 | Safakhah | H01Q 1/1207 |
| | | | 343/882 |
| 2004/0075196 A1 | 4/2004 | Leyden et al. | |
| 2009/0036568 A1 | 2/2009 | Merle et al. | |
| 2011/0126723 A1* | 6/2011 | Nyquist | B65G 67/22 |
| | | | 100/43 |
| 2011/0243649 A1 | 10/2011 | Kim | |
| 2012/0096804 A1 | 4/2012 | Gutierrez Tenreiro et al. | |
| 2012/0311941 A1* | 12/2012 | Edwards | E04B 7/08 |
| | | | 52/79.9 |
| 2014/0009259 A1 | 1/2014 | Blumenthal | |
| 2014/0086667 A1* | 3/2014 | Elterman | F16C 11/0633 |
| | | | 403/122 |
| 2014/0086704 A1 | 3/2014 | Hemingway et al. | |
| 2016/0072185 A1* | 3/2016 | Lanciault | H01Q 3/20 |
| | | | 343/761 |
| 2019/0126331 A1* | 5/2019 | VanderWoude | A61M 5/3205 |

* cited by examiner

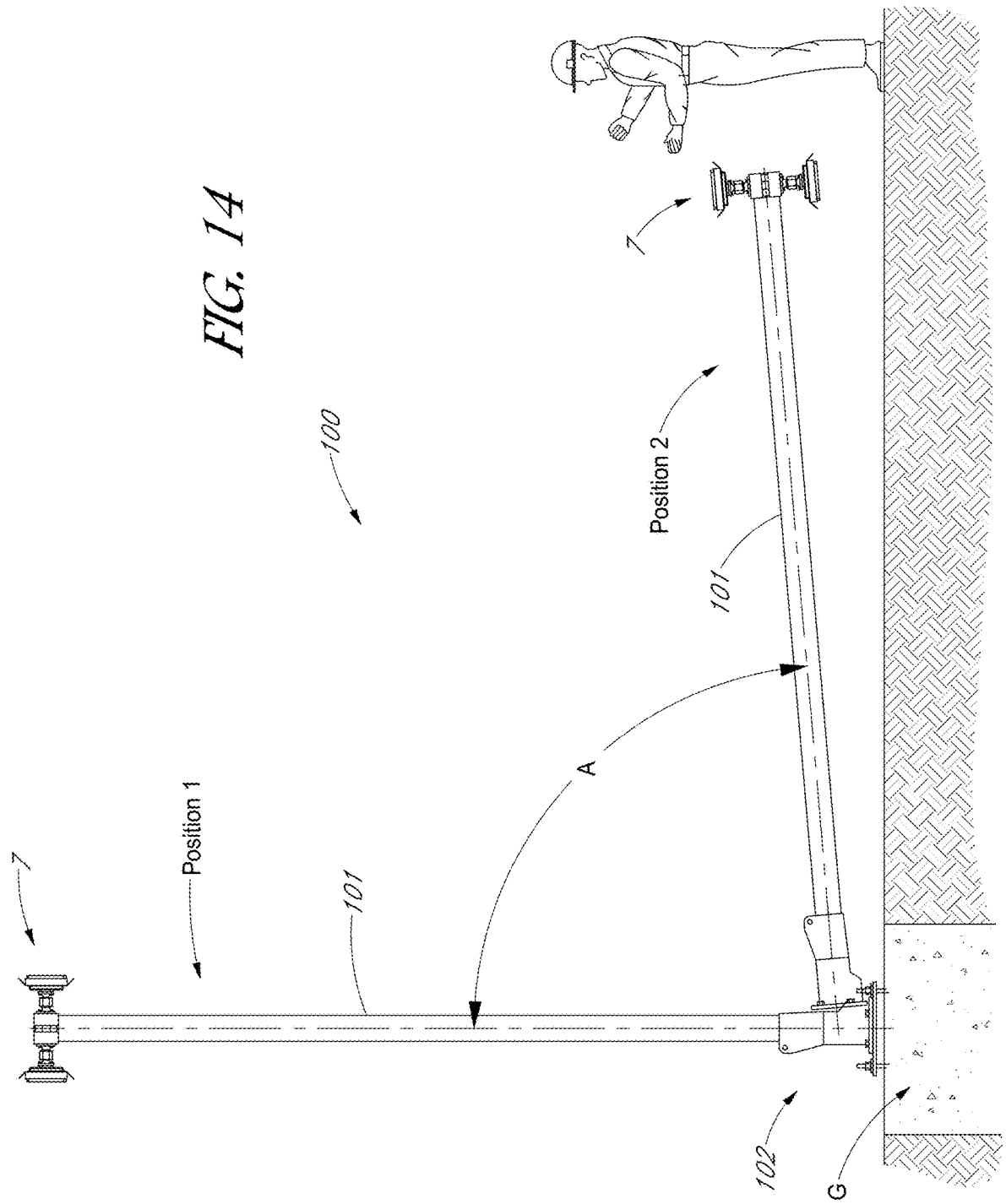

SUPPORT STRUCTURES FOR TRANSPORTATION SYSTEMS

CROSS-REFERENCE TO RELATED APPLICATIONS

This application claims priority to U.S. Provisional Patent Application No. 62/646,300, filed Mar. 21, 2018, the entire contents of which are incorporated by reference herein in their entirety and for all purposes.

BACKGROUND

Field

The field relates to support structures for transportation systems.

Description of the Related Art

In some transportation systems, components such as antennas can be mounted directly to structures of the surrounding environment. For example, in train systems that include tunnels, the antennas can be mounted to the wall of the tunnel. The antennas can transmit data to and/or receive data from the train as it passes through the tunnel. The data can be processed to determine a status of the train. However, it can be difficult and/or expensive to assemble components directly into the surrounding environment, such as a tunnel.

SUMMARY

In one embodiment, a support structure comprising a self-supporting arch assembly is disclosed. The self-supporting arch assembly can be configured to support one or more devices in a transportation system.

In another embodiment, a support structure configured to support one or more devices in a transportation system is disclosed. The support structure can include a base plate and a receiver body. The receive body can include an inner wall that defines a receiver chamber sized and shaped to receive a mast that supports the one or more devices. The receive body can include a hinge element extending radially outward from an outer wall of the receiver body, the hinge element pivotally connected to the base plate. The receive body can include a flange at a lower portion of the receiver body, the flange extending circumferentially about the outer wall of the receiver body. One or more fasteners can connect the flange to the base plate. The receiver body can comprise a seamless, monolithic structure.

In another embodiment, a support structure configured to support one or more devices in a transportation system is disclosed. The support structure can include an anchor member and a pivot member pivotally engaged relative to the anchor member such that the pivot member can pivot about a pivot axis. The support structure can include a mounting structure disposed at a distal portion of the pivot member, the mounting structure configured to support the one or more devices. At least one of the anchor member, the pivot member, and the mounting structure can be formed by a three-dimensional (3D) printing technique.

In another embodiment, a support structure configured to support one or more devices in a transportation system is disclosed. The support structure can include one or more capillaries in or on the support structure. The support structure can include a self-healing resin disposed in the one or more capillaries, the self-healing resin arranged to seal or fill a crack or deformity in the support structure.

In another embodiment, an electrical device mounting assembly configured to mount an electrical device to a support structure in a transportation system is disclosed. The assembly can include a fitting having a wall that defines an internal channel. The assembly can include a ball seat mechanically connected to a lateral side surface of the fitting, with the wall of the fitting between the ball seat and the internal channel. The assembly can include a ball joint received within the ball seat and configured to connect to an electrical device, the ball joint configured to rotate relative to the ball seat. The assembly can include a nut disposed over the ball joint and connected to the ball seat to laterally constrain the ball joint relative to the balls seat. One or more of the fitting, the ball seat, the ball joint, and the nut can comprise seamless, monolithic bodies.

The systems and methods of the present disclosure have several features, no single one of which is solely responsible for its desirable attributes. Without limiting the scope of this disclosure as expressed by the claims which follow, various features will now be discussed briefly. After considering this discussion, and particularly after reading the section entitled "Detailed Description," one will understand how the features described herein provide several advantages over traditional gas delivery methods and systems.

BRIEF DESCRIPTION OF THE DRAWINGS

These and other features, aspects and advantages of the present invention will now be described with reference to the drawings of several embodiments, which embodiments are intended to illustrate and not to limit the invention.

FIG. 14 is a schematic side view of a hinged mast assembly in first and second rotational positions, according to one embodiment.

DETAILED DESCRIPTION

Figure 1:
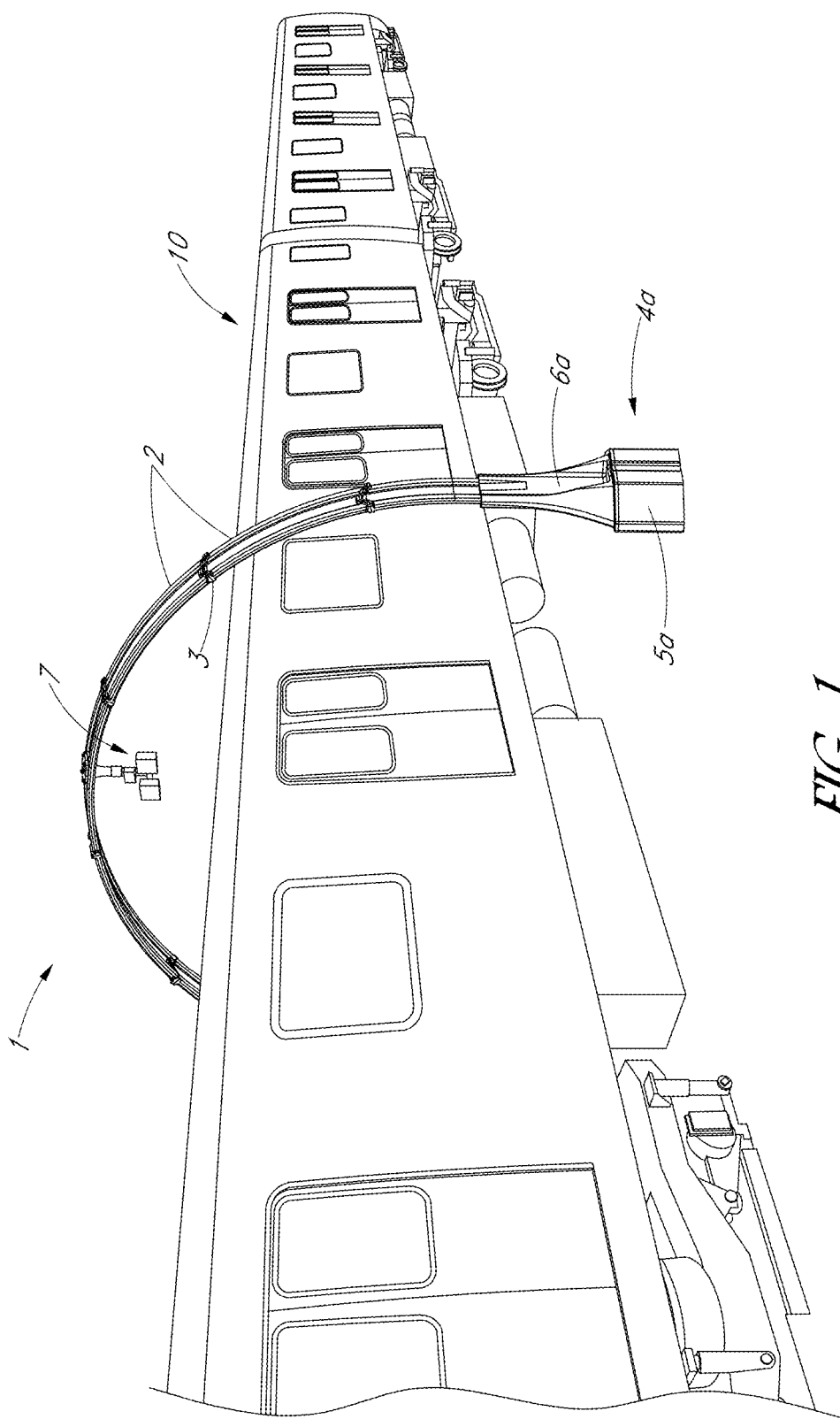
FIG. 1 is a schematic perspective view of an arch assembly installed in a transportation system, according to various embodiments.

Various embodiments disclosed herein relate to a support structure for a transportation system. The support structure can be used to support one or more devices, such as an antenna, as described above. In some embodiments, the support structure can comprise a self-supporting arch assembly that can support its own weight, and the weight of devices, such as electronic devices for wireless communication, mounted thereto. In various embodiments, for example, the support structure can be positioned on a surface, such as the ground or other platform. In some embodiments, the support structure can rest on the surface without being mechanically fastened to the surface. For example, a ballasted anchor can secure the support structure to the surface. In other embodiments, the ballasted anchor can be partially or fully buried under the ground or other support platform. In other embodiments, the support structure can be fastened to the surface with one or more fasteners. For example, in various embodiments, the support structure can comprise a hinged mast that supports an antenna or other electronic device, and can be configured to rotate about a hinged connection to the ground or other platform.

Beneficially, the support structure (e.g., arch assembly or hinged mast), or each component or member of the support structure, can be manufactured using a monolithic fabrication technique, such as a three-dimensional (3D) printing technique or similar techniques that create unitary or monolithic structures that serve as components for the assemblies thought herein, without seams, joints, or intervening adhesives within each component. Beneficially, 3D printing techniques can be used to efficiently form complicated shapes with internal cavities, baffles, etc. Moreover, 3D printing can make components that are thin enough to be provided in small spaces (such as tunnels with small clearances), while maintaining structural integrity. Moreover, 3D printing can help reduce stockpiles of components in some embodiments, since different sizes can be made to order. Further, 3D printing can reduce shipping costs, since in some cases the materials and design files for an unassembled component can be sent to another location and printed at the other location, rather than shipping the assembled component itself.

In some embodiments, the support structure (e.g., arch assembly or hinged mast) can comprise a polymer (e.g., a graphene reinforced plastic). In some embodiments, the support structure can comprise a thermoplastic material, such as acrylonitrile styrene acrylate (ASA). For example, in various embodiments, the support structure can comprise KIBILAC® PS-957, provided by Chi Mei Corporation of Taiwan. Employment of 3D printing techniques advantageously facilitate tailoring assemblies for the unique environments of need entailed by historical railroad infrastructure, and particularly for restrictive environments for municipal commuter rail and subway systems, without having to maintain inventories of multiple different configurations.

The arch assembly may have a high strength-to-weight ratio, such that the arch assembly can support large loads while maintaining a low weight for ease of maneuverability and assembly. Advantageously, the self-supporting structure can have a very low thickness (e.g., less than 100 mm, and more particularly less than about 60 mm) and can serve its function even where very little space is available, such as between historical tunnels and trains running through them.

By contrast, conventional systems can include antennas manually mounted to the environment, such as a tunnel through which a train passes. Manually installing such antennas and the cables (and/or other devices associated with the antennas) can take an inordinate amount of time and/or lead to excessive expenses. It can be important to be able to install a support structure quickly. For example, there may be very short windows of time available at the site for installation, e.g., due to high traffic demands in the transportation system. Further, it may take a significant amount of time for chemical adhesives or other fixings to cure in conventional installation methods. Aging tunnels and structures may have crumbling brick or other construction materials as well, increasing the need for fast installation. Additionally, conventional techniques utilize small teams of people to move construction materials that are very heavy and difficult to fabricate, which can be time-consuming and/or may lead to mistakes or incorrect equipment being installed. There may also be a high variation in the existing infrastructure across different sites, which may lead to different solutions for different sites. Accordingly, there remains a need for improved support structures in systems, such as transportation systems.

The embodiments disclosed herein can be quickly installed, with a reduced risk of installation errors. For example, the installer(s) can simply bring the arch assembly to the place to be installed. In some embodiments, the antenna or other device (and associated cables) may be pre-installed on the arch assembly. The installer(s) can dig two holes in the ground (or can remove concrete or other portions of the surface), and can place first and second anchors in the two holes. The installer(s) can place ballast (e.g., dirt and or stones) in cavities of the first and second anchors to weigh down the anchor assembly. Respective lids or caps can be provided over the first and second anchors to enclose the cavities and ballast. The installer(s) can connect opposing ends of the arch assembly to the first and second anchors, e.g., by way of fasteners such as bolts, pins, etc. The rapid assembly and installation of the arch assembly can significantly reduce the time it takes to mount brackets, antennas and other devices across the transportation system, at reduced cost. Moreover, site-specific solutions can be designed using, for example, 3D printing techniques for manufacturing the support structures. The ballasted anchor assemblies described herein can further ease installation of the support structure in various embodiments. The height of the support structure (e.g., arch assembly) may also be adjusted in various embodiments, either in the printing process or by providing components that can be fixed at different positions, e.g., through multiple holes for extending bolts or pins therethrough at different height configurations.

The antenna (or data SIM card) can link up with the transportation system's infrastructure asset management system (AMS) (e.g., a computer system or network) to notify the network of any problems with the arch assembly. If the arch assembly develops structural damage, such as cracks, self-healing resins stored inside the arch assembly may be released. These resins can seal over the cracks, reacting with the air to quickly form a strong bond on any exposed weaknesses. The resin can seal, fix and hold the damaged section under stress. In embodiments, the resin can be provided to dry and remain or form a bright, easily identifiable color. The arch assembly can also be configured to send a signal back to the AMS to indicate damage.

Thus, the embodiments disclosed herein save significant cost and time on large infrastructure rail upgrade projects because the arch assembly can be assembled rapidly and installed on-site. The arch assembly can replace the current installation methods, and may have significant strength and durability for challenging operating environments. The arch assembly can be installed many times (e.g. four times) faster than current installation methods, particularly in tunnels. The arch assembly may also be safe for the installer(s) to assemble. The arch assembly can beneficially be lightweight, does not involve working at great heights, and is easy to assembly, significantly reducing the risk of installation errors. Besides railway applications, the arch assembly can be used in other transportation systems, such as highway systems, aviation systems, etc.

Furthermore, the self-healing resins disclosed above can significantly improve rail maintenance strategies and improve on safety measures, save installation time, reduce cost and improve quality of installation on the infrastructure. The arch assembly can reduce maintenance time by enabling visual inspection at ground level by highlighted resin colored fixes. Additionally, the arch assembly can be configured to communicate any problems it may have and order spare parts and have them rapidly delivered to the installer(s), which can improve preventative maintenance strategies.

The arch assembly can be installed on transportation systems faster (e.g., four times faster) than the current methodology. Compared to the existing systems, the arch assembly can be considerably lighter in weight to handle and lift, significantly reducing the risk profile of installation and associated injuries. The current methodology and product also utilizes laborers working at height over long periods of time. The arch assembly does not require installer(s) to work at great heights and thus significantly reduces the risk profile of installation and associated injuries. The arch assembly's simple installation may be assembled and installed in one way, reducing assembly errors. The current systems generate on-site installation errors, which leads to non-compliances and risks asset failure, and in turn may affect the safety and running of trains.

The arch assembly can be manufactured by 3D printing, extrusion, investment casting, etc. Manufacturing by 3D printing can be accomplished within a short period of time (e.g., on the order of hours), which is a significant improvement over current infrastructure technologies. The arch assembly can also improve the transport supply chain and maintenance strategies with the rapid supply of complete arch assemblies and spare parts. The arch assembly's advanced self-ordering features means that a spare part can commence printing within minutes of the order being placed. Printing the parts also allows for rapid customization of parts for available space due to numerous size restraints along the transportation system (e.g., within tunnels of varying dimensions).

As explained above, the arch assembly can include self-healing properties. The self-healing resin can be placed along the load bearing components (e.g., in capillaries along the arch assembly), which if bent or cracked sufficiently will leak the resin and self-heal. The self-healing feature can reduce the risk of failure of the arch assembly and the accordant impact on the running of trains. The self-healing feature also supports visual inspections as the user will be able to see if an arch assembly has started to fail with brightly colored resin being displayed.

The arch assembly can have the ability to monitor its own health and status and communicate this digitally back to the transportation system, which can improve the operational running of the transport network. Further, the materials of the arch assembly taught herein can have a long lifetime, e.g., an asset life of over 100 years, which is greater than typical lifetimes of 60 years. Thus, the embodiments disclosed herein can include an arch assembly having an improved speed of installation, excellent safety profile, long asset life, rapid manufacture, simple maintenance profile, advanced self-healing properties and its ability to communicate its health and status to the transportation system.

In one embodiment, a support structure is disclosed. The support structure can comprise a self-supporting arch assembly, the self-supporting arch assembly configured to support one or more devices in a transportation system.

In some embodiments, the support structure can comprise a first anchor member and a second anchor member, the arch assembly mechanically supported by the first and second anchor members. First and second ends of the arch assembly can be connected to the respective first and second anchor members in any suitable manner. For example, in some embodiments, the first and second ends can slide into corresponding slots or openings of the first and second anchor members. In some embodiments, the first and second ends can be fastened to the first and second anchor members by a fastener (such as a bolt, pin, etc.). Multiple aligned openings can be provided in adjoining members for variable height in a single support structure construction. The support structure can comprise a mounting structure on the arch assembly, the mounting structure configured to support the one or more devices. The one or more devices can comprise an antenna. The antenna can be configured to wirelessly communicate with a computer system of the transportation system. An electrical connector can be disposed along the arch assembly (e.g., which a surface groove or through hollow members), the electrical connector configured to provide electrical communication between the one or more devices and the computer system of the transportation system. The first and second anchors can comprise respective first and second cavities configured to receive ballast therein. The first and second anchors can be configured to be buried partially or fully underground, or to sit atop the ground. A first lid or cap can be configured to engage the first anchor over the first cavity and a second lid or cap can be configured to engage the second anchor over the second cavity. At least one of the first anchor, the first lid, the second anchor, and the second lid can be formed by a three-dimensional (3D) printing technique. The 3D printing technique can include embossed location and structural information of the printed structures.

In some embodiments, the arch assembly can comprise a single arch member. The single arch member can comprise a three-dimensionally (3D) printed member. In some embodiments, the arch assembly can comprise a plurality of arch members mechanically connected to one another. For example, in such embodiment, adjacent arch members can be connected by joints, such as pin joints. Each arch member of the plurality of arch members can comprise a three-dimensionally (3D) printed member. In some embodiments, the arch assembly comprises a honeycomb cross-section. The arch assembly can comprise a diameter greater than 3 meters in some embodiments. In some embodiments, the diameter can be in a range of 4 meters to 20 meters. In some embodiments, a thickness of the arch assembly (including the walls of each arch member and the space between the walls) can be less than about 250 mm, e.g., less than about 100 mm. In some embodiments, the thickness of the arch assembly can be less than 60 mm. In some embodiments, the thickness of the arch assembly can be less than 50 mm. In some embodiments, the thickness of the arch assembly can be in a range of 25 mm to 75 mm. In some embodiments, the arch assembly can subtend an angle in a range of 170° to 190°. The arch assembly can comprise a plastic material. For example, the arch assembly can comprise a graphene reinforced fiber material (e.g., Graphene Enhanced PLA fiber plastic). In some embodiments, the arch assembly can comprise a conductive material. For example, in various embodiments, the conductive material can be provided along the arch assembly (and coated with an insulator), e.g., by 3D printing, and an electrical current can pass along the conductive material. If there is a failure (e.g., crack, rupture, or other damage), then the current can be interrupted, and a signal can report the interruption back to a computer system monitored by the administrator of the transportation system. In some embodiments, one or more wires can extend through the arch assembly to the one or more devices. In some embodiments, the arch assembly can be formed from a conductive material. In some embodiments, the arch assembly can be configured to self-report damage and automatically initiate ordering and/or manufacturing of replacement parts. In some embodiments, the support structure can be structured to support a mass of at least 50 kg without failing. In some embodiments, the support structure can be structured to support a mass in a range of 50 kg to 100 kg without failing.

In some embodiments, the support structure can comprise one or more capillaries in or on the arch assembly. A self-healing resin can be disposed in the one or more capillaries, the self-healing resin arranged to seal or fill a crack or deformity in the arch assembly. The self-healing resin can be colored differently from the structural material of the arch assembly so as to indicate the presence of a crack or deformity in the arch assembly.

In some embodiments, the support structure can comprise one or more sensors (e.g., strain gauges) coupled to the arch assembly. For example, the sensors can be configured to determine if there are any cracks or structural weaknesses in the support structure. The arch assembly can be configured to determine a status of the mechanical integrity of the arch assembly and to report the status to the transportation system.

In another embodiment, a support structure configured to support one or more devices in a transportation system is disclosed. The support structure can comprise an anchor member and a pivot member pivotally engaged relative to the anchor member such that the pivot member can pivot about a pivot axis. The support structure can comprise a mounting structure disposed at a distal portion of the pivot member, the mounting structure configured to support the one or more devices.

In some embodiments, the anchor member can be formed by a three-dimensional (3D) printing technique. In some embodiments, the pivot member can be formed by a three-dimensional (3D) printing technique. The anchor member can comprise a cavity configured to receive ballast therein. The anchor member can be 3D printed for the available anchoring space in a particular installation location and be configured to be buried underground.

In another embodiment, a support structure configured to support one or more devices in a transportation system is disclosed. The support structure can include one or more capillaries in or on the support structure. The support structure can comprise a self-healing resin disposed in the one or more capillaries, the self-healing resin arranged to seal or fill a crack or deformity in the support structure.

In some embodiments, the self-healing resin can be colored differently from the support structure so as to indicate the presence of a crack or deformity in the support structure. The support structure can comprise a plurality of 3D printed members.

Figure 2:
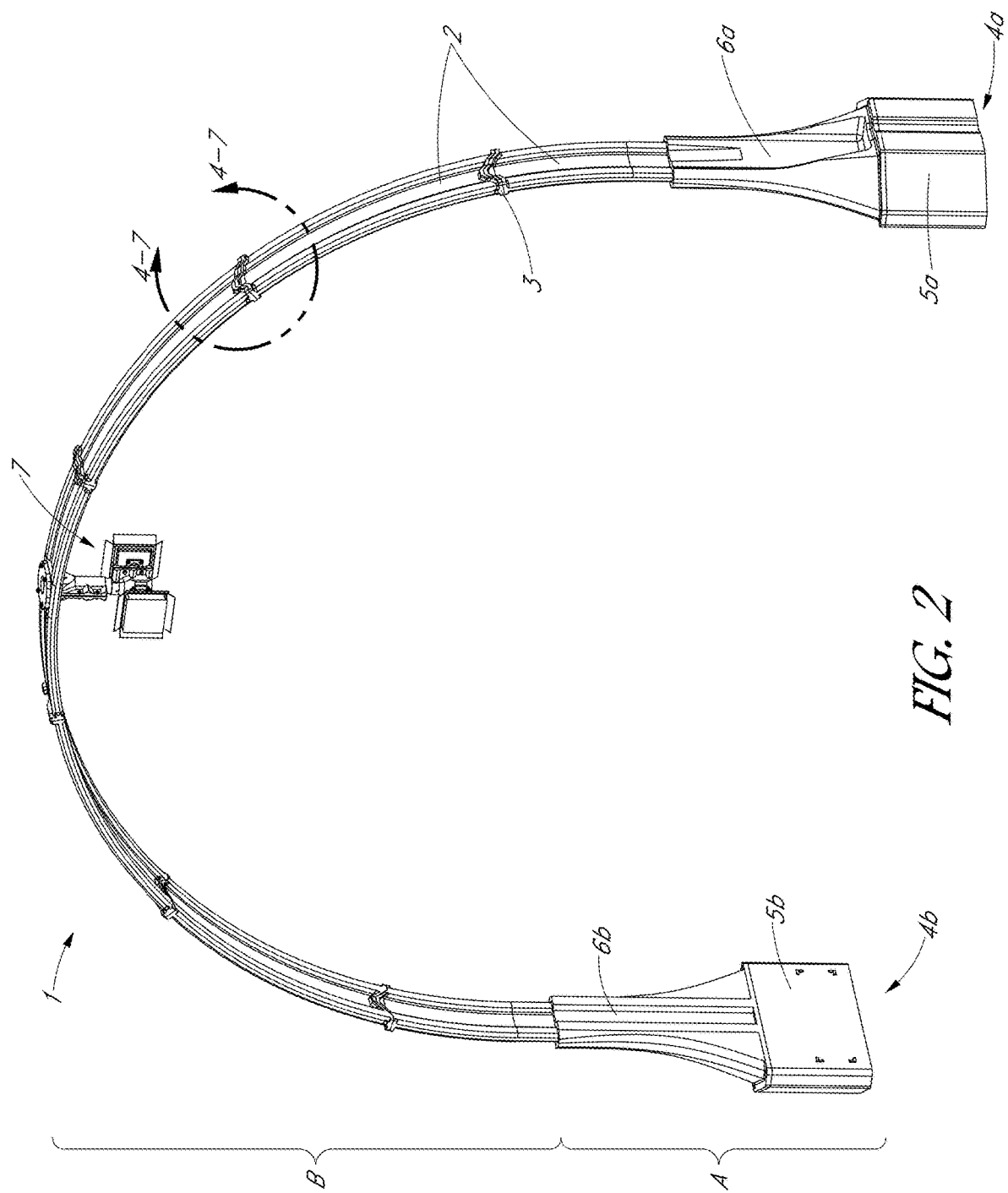
FIG. 2 is a schematic perspective view of an arch assembly according to various embodiments, shown assembled but not installed in a transportation system.
Figure 3:
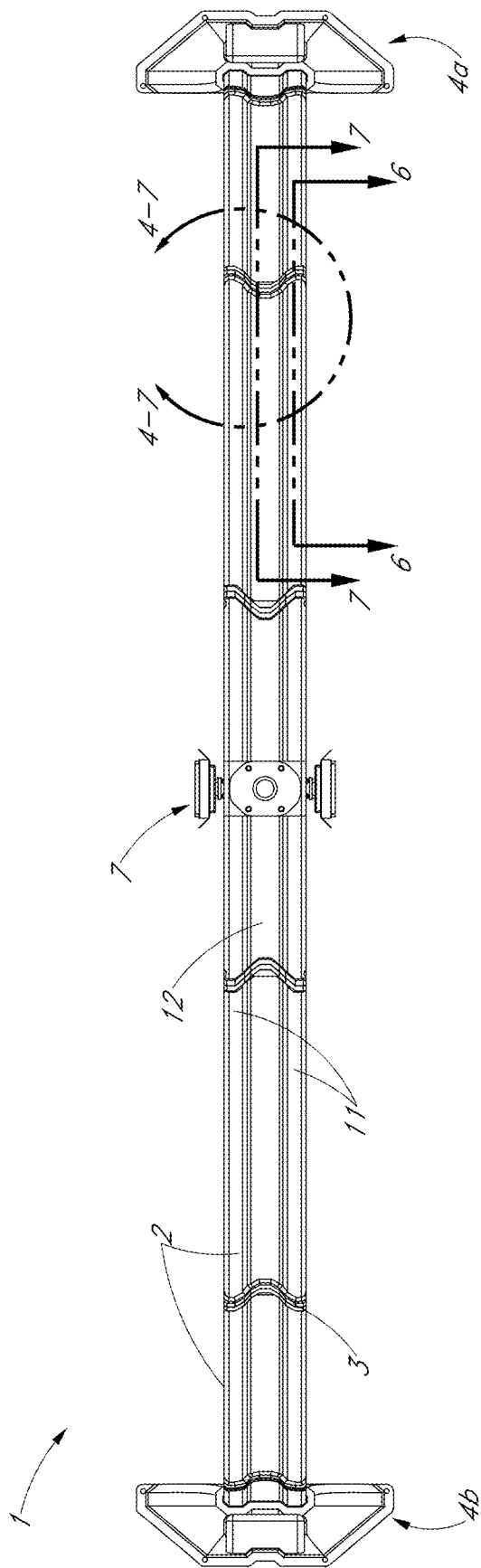
FIG. 3 is a top plan view of the arch assembly shown in FIG. 2.

FIGS. 1-10 illustrate a support structure comprising an arch assembly 1, according to various embodiments. FIG. 1 is a schematic perspective view of the arch assembly 1 installed in a transportation system. FIG. 2 is a schematic perspective view of an arch assembly 1 according to various embodiments, shown uninstalled in the transportation system. FIG. 3 is a top plan view of the arch assembly 1 shown in FIG. 2. The transportation system shown in FIG. 1 comprises a rail or train system, in which a train 10 travels along a system of tracks. However, in other embodiments, the arch assembly 1 can be used in conjunction with other types of transportation systems, or even with non-transportation systems.

As explained above, the arch assembly 1 can comprise a self-supporting arch structure that physically supports a device, such as an antenna assembly 7. As shown in FIGS. 1-3, the antenna assembly 7 may be disposed at an upper portion (e.g., an uppermost portion) of the arch assembly 1. In other embodiments, however, the arch assembly 7 can be disposed on other portions of the arch assembly 1. The antenna assembly 7 can comprise one or more antennas in data communication with a computer system of the transportation system. As explained above, as the train 10 passes near or underneath the antenna assembly 7, the antenna assembly can receive and/or transmit wireless signals from and/or to the train 10. For example, in some embodiments, the antenna assembly 7 can receive a signal from the train 10 that indicates the time at which the train 10 passes the antenna assembly 7. The transportation system can control the routing of the trains using the antenna assembly 7 in various embodiments. For example, the antenna assembly 7 can determine locations of trains over time and can change routing tracks based on this information. Additional data regarding a status or speed of the train, or communications data from the train (such as radio signals from the train operator), may be transmitted to the antenna assembly 7. Also, the antenna assembly 7 can be configured to transmit a signal to the train 10 that may provide communication from the computer system to the train 10 and the train operator, and/or other data from personnel of the transportation system to the train operator or computer systems on the train 10. In various embodiments, as explained above, the arch assembly 1 can be installed in low clearance areas, such as in tunnels and the like. Beneficially, as explained above, the arch assembly 1 can have a small thickness so as to fit within small tunnels.

As shown in FIGS. 1-3, the arch assembly 1 can comprise anchor assemblies 4a, 4b that can be set on or in the ground (or other surface or platform). As shown, anchor assembly 4a can be provided on one side of the train tracks and anchor assembly 4b can be provided on the opposite side of the train tracks. The anchor assemblies 4a, 4b can comprise respective anchors 5a, 5b and caps 6a, 6b disposed over and connected to the anchors 5a, 5b. As explained herein, ballast (e.g., dirt, concrete, or other heavy material) may be provided within respective cavities of the anchors 5a, 5b. The caps 6a, 6b can be connected to the anchors 5a, 5b over the ballast within the cavities to enclose the ballast within the anchors 5a, 5b. Beneficially, the ballasted anchor assemblies 4a, 4b shown in FIGS. 1-3 can be set upon or in the ground without requiring the use of mechanical fasteners to connect the anchor assemblies 4a, 4b to the ground (or other support surface or platform). Rather, the ballast within the anchor assemblies 4a, 4b may have sufficient mass (or weight) so as to resist uplift forces and overturning moments that may be imparted to the arch assembly 1. For example, in various embodiments, the arch assembly 1 can have a mass in a range of 40 kg to 80 kg, or in a range of 50 kg to 70 kg, e.g., about 60 kg. In some embodiments, the anchor assemblies 4a, 4b can be filled with ballast (e.g., dirt, concrete, mud, etc.) having a mass in a range of 700 kg to 1500 kg, in a range of 700 kg to 1200 kg, in a range of 800 kg to 1200 kg, or in a range of 850 kg to 1150 kg. In some embodiments, a ratio of the mass of the total ballast to the mass of the arch assembly 1 can be in a range of 8:1 to 35:1, in a range of 10:1 to 25:1, in a range of 10:1 to 20:1, in a range of 12:1 to 18:1, or in a range of 14:1 to 18:1.

The arch assembly 1 can further comprise one or a plurality of arch members 2 that define the shape of the arch assembly 1. In some embodiments, the arch assembly 1 can comprise a single arch member 2. In the embodiment shown in FIGS. 1-3, however, the arch assembly 1 comprises a plurality of arch members 2 connected together at their ends by intervening joints 3. Each arch member 2 accordingly may define a segment (e.g., a curved segment) of the arch assembly 1. As shown in FIG. 2, in a region A of the arch assembly, for example near the anchor assemblies 4a, 4b, the arch assembly 1 can extend generally vertically upwards so as to enable the arch assembly 1 to clear the height of the train. In a region B of the arch assembly 1, the arch members 2 can be curved to define the arched profile of the arch assembly 1. In some embodiments, each of the arch members 2 may have generally the same radius of curvature. In other embodiments, some arch members 2 may be different radii of curvature from other arch members 2. As explained above, the arch members 2 can be sized and shaped to provide a diameter of the arch assembly 1 to be greater than 3 meters in some embodiments. In some embodiments, the diameter of the arch assembly 1 can be in a range of 4 meters to 20 meters. Any suitable number of arch members 2 may be provided. For example, in some embodiments, only a single arch member may be provided. In other embodiments, two, three, four, five, six, seven, eight, or more arch members 2 may be provided. In the illustrated embodiment, five arch members 2 extend from anchor assembly 4a to anchor assembly 4b.

Further, the thickness of each arch member 2 can be made sufficiently thin, while maintaining its strength, so as to fit in small spaces between the train and a small tunnel through which the train passes. For example, in some embodiments, a thickness of the arch members 2 (including thicknesses of the upper and lower walls, as well as any intervening cavities, spaces or chambers) can be less than about 250 mm, e.g., less than about 100 mm. In some embodiments, the thickness of the arch members 2 can be less than 60 mm. In some embodiments, the thickness of the arch members 2 can be less than 50 mm. In some embodiments, the thickness of the arch members 2 can be in a range of 25 mm to 75 mm. In some embodiments, the arch assembly 1 can subtend an angle in a range of 170° to 190°.

As explained above, any or all of the arch members 2, the anchors 5a, 5b, and the caps 6a, 6b can be defined to form respective unitary or monolithic structures, e.g., structures that can delimit complex shapes in a seamless manner, without mechanical fasteners or adhesives. For example, any or all of the arch members 2, the anchors 5a, 5b, and the caps 6a, 6b can be defined with a 3D printing technique. Beneficially, as explained above, 3D printing techniques can create structures that have complex shapes, internal structures and webs (e.g., honeycomb-like structures), and cavities, as explained herein in connection to, e.g., FIGS. 6-7 below. The use of lightweight materials (such as polymeric materials) in combination with robust structural support features can provide a high strength-to-weight ratio so that the arch assembly 1 can be lightweight and strong, as explained above. Indeed, using monolithic fabrication techniques like 3D printing can result in structures that have high strength-to-weight ratios as compared to molded or other parts.

Figure 4:
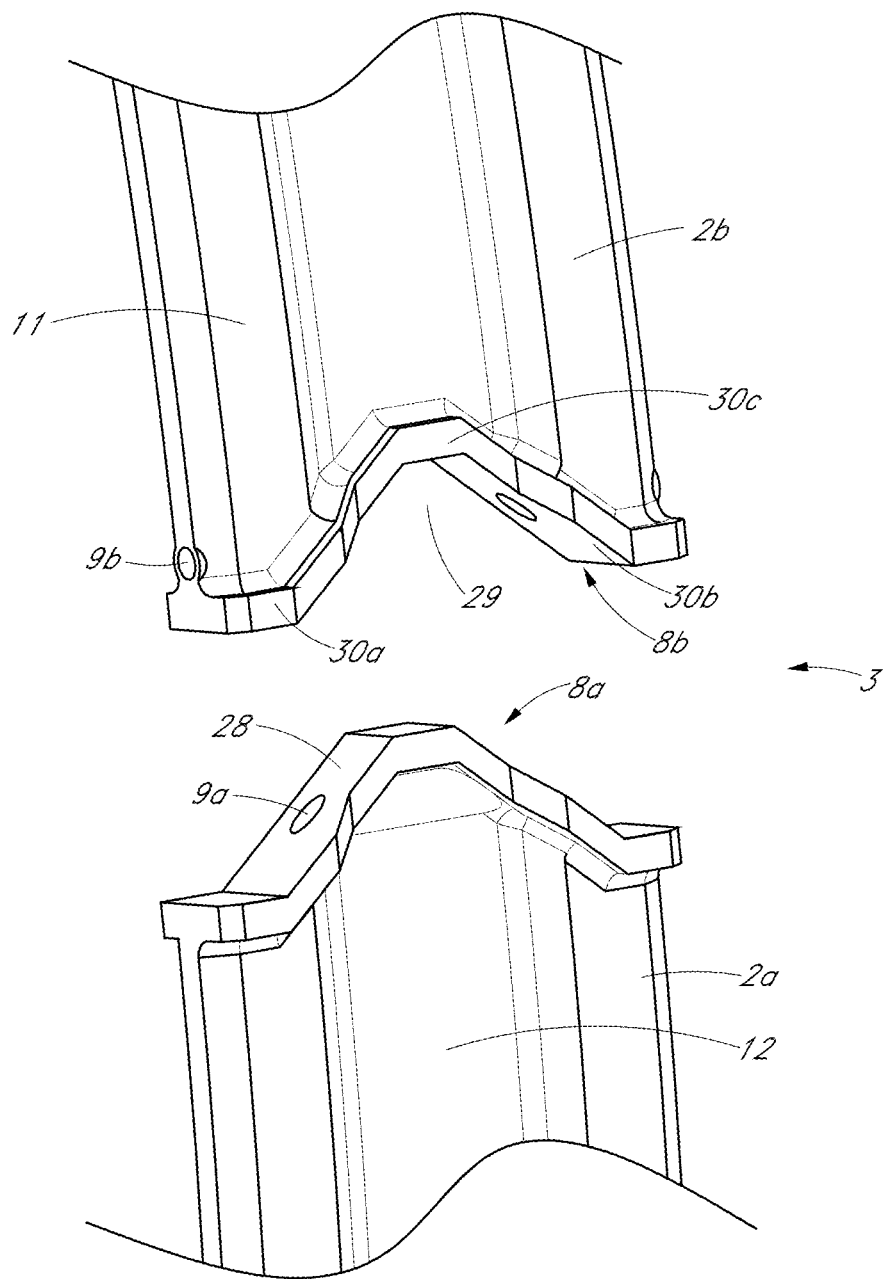
FIG. 4 is a schematic magnified, perspective view of two adjacent arch members shown separated from one another, for example, before being connected together.
Figure 5:
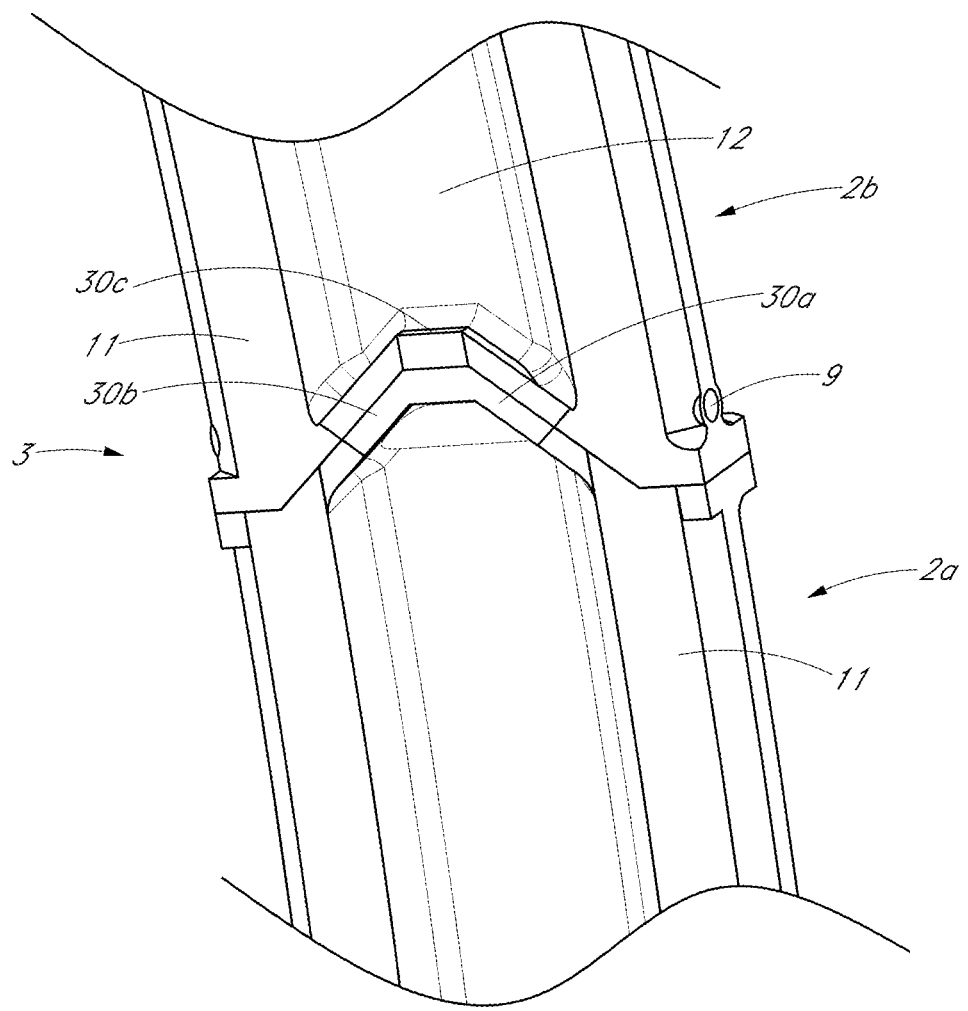
FIG. 5 is a schematic magnified, perspective view of two adjacent arch members connected together by a joint disposed between the arch members.
Figure 6:
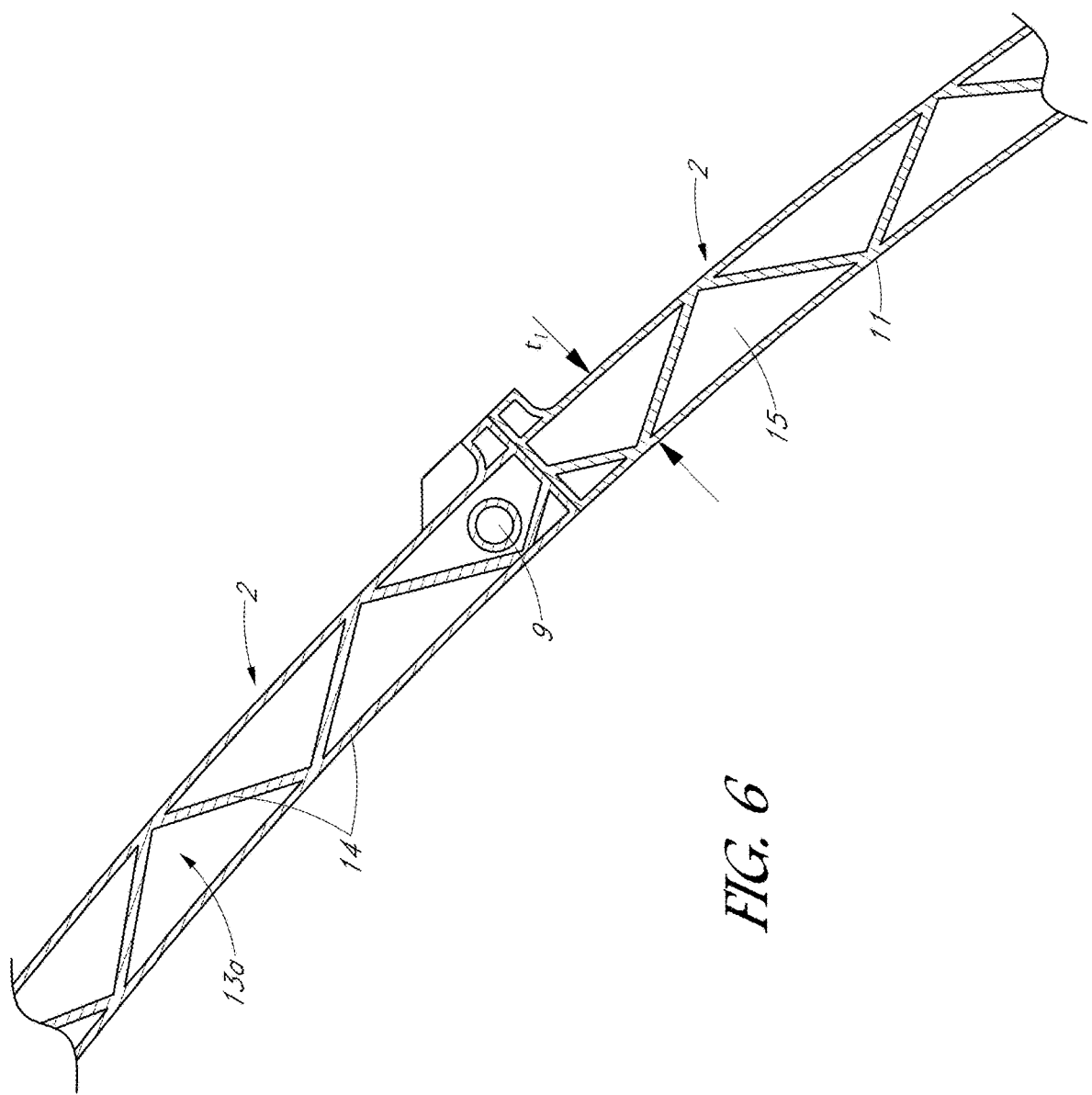
FIG. 6 is a schematic side sectional view of the arch members and joint shown in FIG. 5, taken along section 6-6 shown in FIG. 3.
Figure 7:
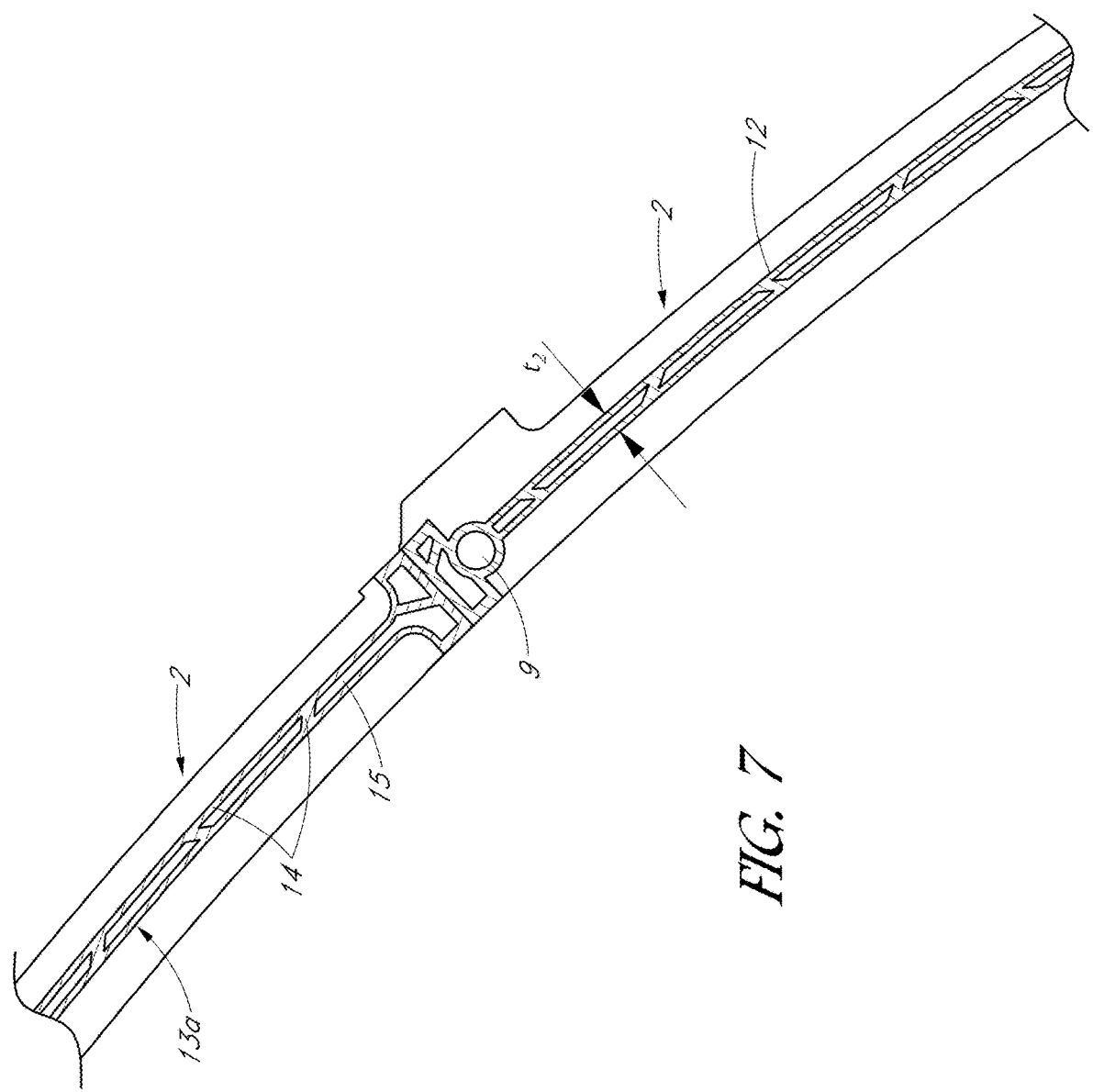
FIG. 7 is a schematic side sectional view of the arch members and joint shown in FIG. 5, taken along section 7-7 shown in FIG. 3.

Turning to FIGS. 4-7, additional details regarding the arch members 2 and joints 3 are provided. FIG. 4 is a schematic magnified, perspective view of two adjacent arch members 2 shown separated from one another, for example, before being connected together. FIG. 5 is a schematic magnified, perspective view of two adjacent arch members 2 connected together by a joint 3 disposed between the arch members 2. As shown, the joint 3 can extend parallel to a width of the arch members 2, e.g., transverse to the radial and circumferential directions of the arch assembly 1. FIG. 6 is a schematic side sectional view of the arch members 2 and joint 3 shown in FIG. 5, taken along section 6-6 shown in FIG. 3. FIG. 7 is a schematic side sectional view of the arch members 2 and joint 3 shown in FIG. 5, taken along section 7-7 shown in FIG. 3.

As shown in FIG. 4, each arch member 2a, 2b can have a first engagement feature 8a at a first end of the arch member 2 and a second engagement feature 8b at a second opposite end of the arch member. In FIG. 4, for example, the first engagement feature 8a at the first end of the arch member 2a can be sized and shaped to engage with the second engagement feature 8b at the second end of the arch member 2b. The first engagement feature 8a at the first end of a particular arch member 2 can have a different shape from the second engagement feature 8b at the second end of the particular arch member 2. For example, the first and second engagement features 8a, 8b can have complementary shapes such that, when the first and second engagement features 8a, 8b of adjacent arch members 2a, 2b are brought together, the first engagement feature 8a is at least partially nested or received within the first engagement feature 8b.

As shown in FIG. 4, the first engagement feature 8a can comprise a protrusion 28 extending from the end of the arch member 2a, and the second engagement feature 8b can comprise a recess 29 or notch formed in the end of the arch member 2b. The recess 29 can be defined by two angled walls 30a, 30b provided on opposite sides of the recess 29, and a third wall 30c extending between the walls 30a, 30b. The recess 29 and protrusion 28 can have complementary shapes so that the first engagement feature 8a fits snugly within the second engagement feature 8b so as to provide a generally continuous transition between adjacent arch members 2 along the arch assembly 1. Three-dimensional (3D) printing techniques can provide an efficient way of forming arch members 2 having different engagement features 8a, 8b at opposing ends, since 3D printing techniques can be tailored to define complex, arbitrary shapes and structures.

In addition, in FIG. 4, the first engagement feature 8a of arch member 2a can comprise a first opening 9a through the protrusion 28. Similarly, the second engagement feature 8b of arch member 2b can comprise second openings 9b through each wall 30a, 30b on opposite sides of the recess 29. The first and second openings 9a, 9b can be positioned such that, when the first and second engagement features 8a, 8b are brought together, the first and second openings 9a, 9b are aligned to define a common opening 9 (see FIGS. 5 and 6) through the joint 3. To mechanically connect the arch members 2a, 2b, a fastener (not shown), such as a pin, bolt, screw, etc., can be inserted through the opening 9 to secure the arch members 2a, 2b together.

FIG. 4 also shows that an inwardly-facing surface of the arch members 2a, 2b (e.g., facing the tracks) can comprise one or more angled faces such that the inwardly-facing surface need not be flat or planar. For example, as shown in FIG. 4, the arch members 2a, 2b can have a non-uniform thickness as viewed along a cross-section taken perpendicular to a width of the arch members 2a, 2b. The arch members 2a, 2b can include ridges 11 along outer edges of the arch members 2a, 2b, and a recessed portion 12 disposed between the ridges 11. Thus, as shown in FIG. 4, the ridges 11 at the outer edges of the arch members 2a, 2b can be thicker than the recessed portion 12 between the ridges 11. Moreover, the walls 30a, 30b, 30c can extend between the opposing ridges 11. As shown, the walls 30a, 30b, 30c may also be thicker than the recessed portion 12. The profile of the recessed portion 12 and the ridges 11 can improve the structural integrity of the arch assembly 1 and can also assist in installing the arch assembly 1 by providing a single consistent way of assembling the components. Although FIG. 4 illustrates an inwardly-facing surface of the arch members 2a, 2b, in various embodiments, the outwardly-facing surfaces of the arch members 2a, 2b may be generally similar in shape or profile (see, e.g., the outwardly-facing surfaces of the arch members 2 shown in FIGS. 8A-8C). Further, in various embodiments, one or more electrical or optical cables can be provided along the outer or inner surfaces of the arch members 2. In some embodiments, for example, the cables can be provided along the grooves defined by the recessed portion 12. The cables can electrically connect the antenna assembly 7 (see FIGS. 1 and 2) with the computer system of the transportation system.

Turning to FIG. 6, the illustrated cross-section is taken along the ridge 11 as shown in section 6-6 of FIG. 3. As shown in FIG. 6, the ridge 11 can have a first thickness $t_1$ in a range of 45 mm to 55 mm, or in a range of 49 mm to 51 mm (e.g., about 50 mm), which can be greater than the thickness of the recessed portion 12. The cross-section taken along the length of the ridge 11 along the arch assembly 1, as shown in FIG. 6, can comprise a first truss pattern 13a in which a plurality of interconnected webs 14 are defined so as to provide structural support to the arch member 1 and the loads that it carries. Voids 15 can be disposed within the interconnected webs 14. In some embodiments, a gas (e.g., air) may be in the voids 15. In other embodiments, a filler material or gel may be provided in the voids 15. The first truss pattern 13a comprises a plurality of triangular trusses, but any other suitable shape may be provided. Beneficially, the first truss pattern 13a can provide a high strength-to-weight ratio for the arch member 2 and for the arch assembly 1 as a whole. Without being limited by theory, for example, the interconnected webs 14 of the truss pattern 13a can reinforce the arch assembly, and the voids 15 (e.g., an absence of solid material) can reduce the overall weight of the arch assembly 1. Such internal structures can be provided with 3D printing techniques to achieve higher strength-to-weight ratios, and/or fewer parts, as compared to providing similar structures with molded parts.

Turning to FIG. 7, the illustrated cross-section is taken along the recessed portion 12 as shown in section 7-7 of FIG. 3. As shown in FIG. 7, the recessed portion 12 can have a second thickness $t_2$ in a range of 7 mm to 17 mm, or in a range of 11 mm to 13 mm (e.g. about 12 mm), which can be less than the first thickness $t_1$ of the ridge 11. The cross-section taken along the length of the recessed portion 12 along the arch assembly 1, as shown in FIG. 7, can comprise a second truss pattern 13b in which a plurality of interconnected webs 14 are defined so as to provide structural support to the arch member 1 and the loads that it carries. As with FIG. 6, voids can be provided within enclosed spaces defined by the webs 14. In FIG. 7, however, the second truss pattern 13b can comprise a quadrilateral profile.

The first and second truss patterns 13a, 13b shown in FIGS. 6 and 7 can be difficult to form using conventional techniques. Using 3D printing techniques or other monolithic fabrication techniques can create complex structures with interior voids, angled surfaces, and arbitrary shapes in an efficient manner, thus facilitating higher strength-to-weight ratios.

Figure 8C:
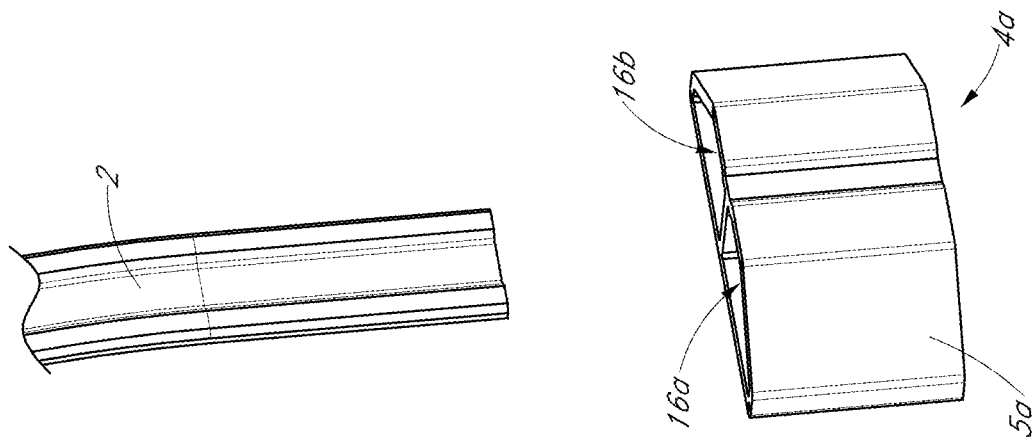
FIG. 8C is a schematic, magnified perspective view showing an arch member and an anchor, but with the intervening cap omitted for purposes of illustration.
Figure 8B:
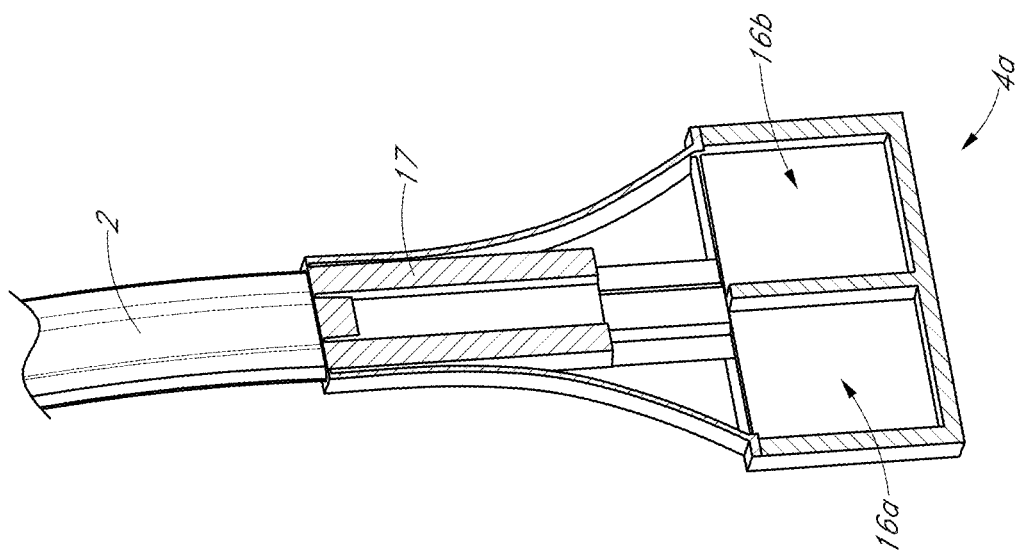
FIG. 8B is a schematic, cross-sectional view of the anchor assembly of FIG. 8A.
Figure 8A:
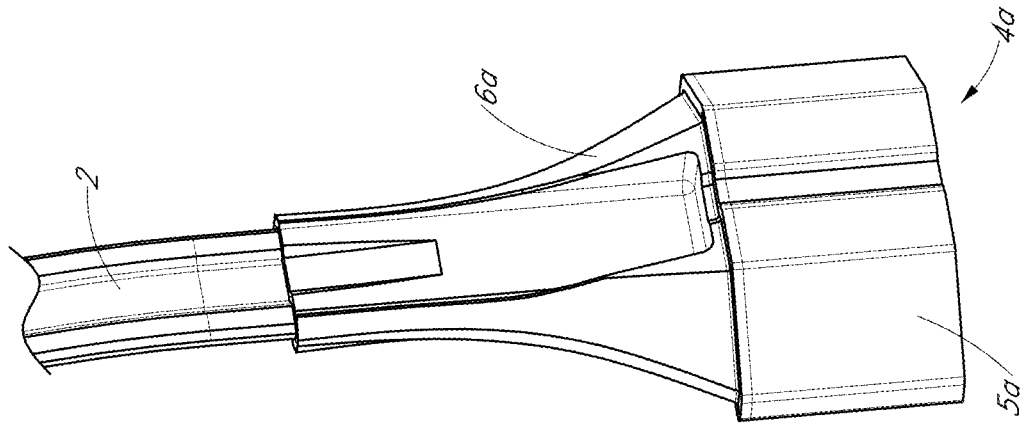
FIG. 8A is a schematic, magnified perspective view of an anchor assembly of the arch assembly of FIG. 1, according to various embodiments.

FIG. 8A is a schematic, magnified perspective view of the anchor assembly 4a, according to various embodiments. FIG. 8B is a schematic, cross-sectional view of the anchor assembly 4a of FIG. 8A. FIG. 8C is a schematic, magnified perspective view showing an arch member 2 and an anchor 5a, but with the intervening cap 6a omitted for purposes of illustration. As explained above and as shown in FIG. 8A, the anchor assembly 4a can comprise an anchor 5a, a cap 6a disposed over and connected to the anchor 5a, and an arch member 2a connected to the anchor assembly 4a. As shown in FIGS. 8B and 8C, the anchor 5a can comprise one or more cavities 16a, 16b formed therein. The cavities 16a, 16b can be readily formed using 3D printing techniques, as compared with conventional manufacturing technologies. Although two cavities 16a, 16b are shown in FIGS. 8B and 8C, it should be appreciated that any suitable number of cavities may be provided, e.g., one cavity, or more than two cavities.

Ballast can be provided in the cavities 16a, 16b of the anchor 5a so as to secure the anchor assembly 1 to the ground or other support surface or platform. In various embodiments, dirt, concrete, or other materials can be provided in the cavities 16a, 16b. As explained above, a sufficient mass or weight of ballast can be provided so as to withstand vertical forces or overturning moments imparted to the arch assembly 1, without requiring any additional mechanical fasteners, connectors, or adhesives. The anchor 5a can be placed on top of the ground or support surface in various embodiments. In other embodiments, at least a portion of the anchor 5a can be buried underneath the ground or support surface. As shown in FIG. 8B, the cap 6a can comprise a slot 17 sized and shaped to receive the arch member 2. For example, the cross-sectional profile of the slot 17 can be shaped to accommodate the profile of the arch member 2 shown and described in connection with FIGS. 4-7. One or more fasteners or connectors (not shown) can mechanically connect the arch member 2 to the cap 6a.

Figure 9:
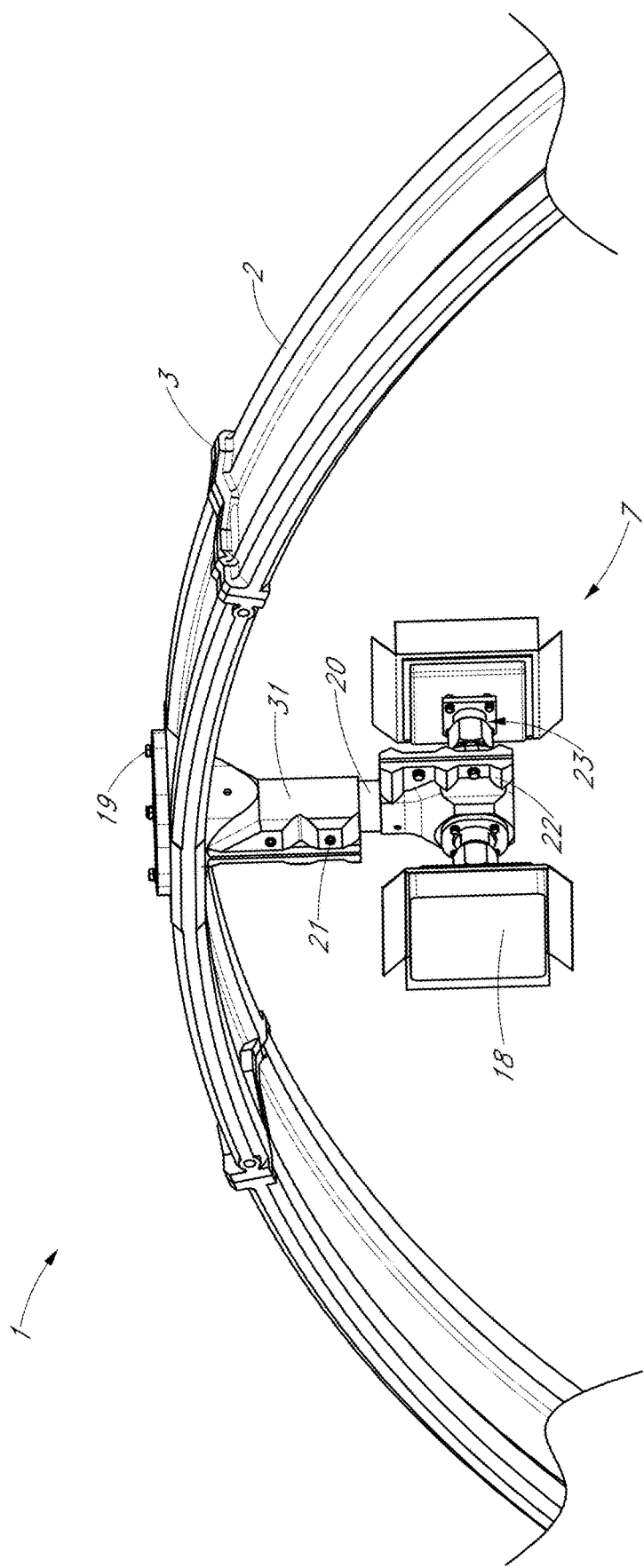
FIG. 9 is a schematic perspective view of an antenna assembly of the arch assembly of FIG. 1, according to one embodiment.
Figure 10:
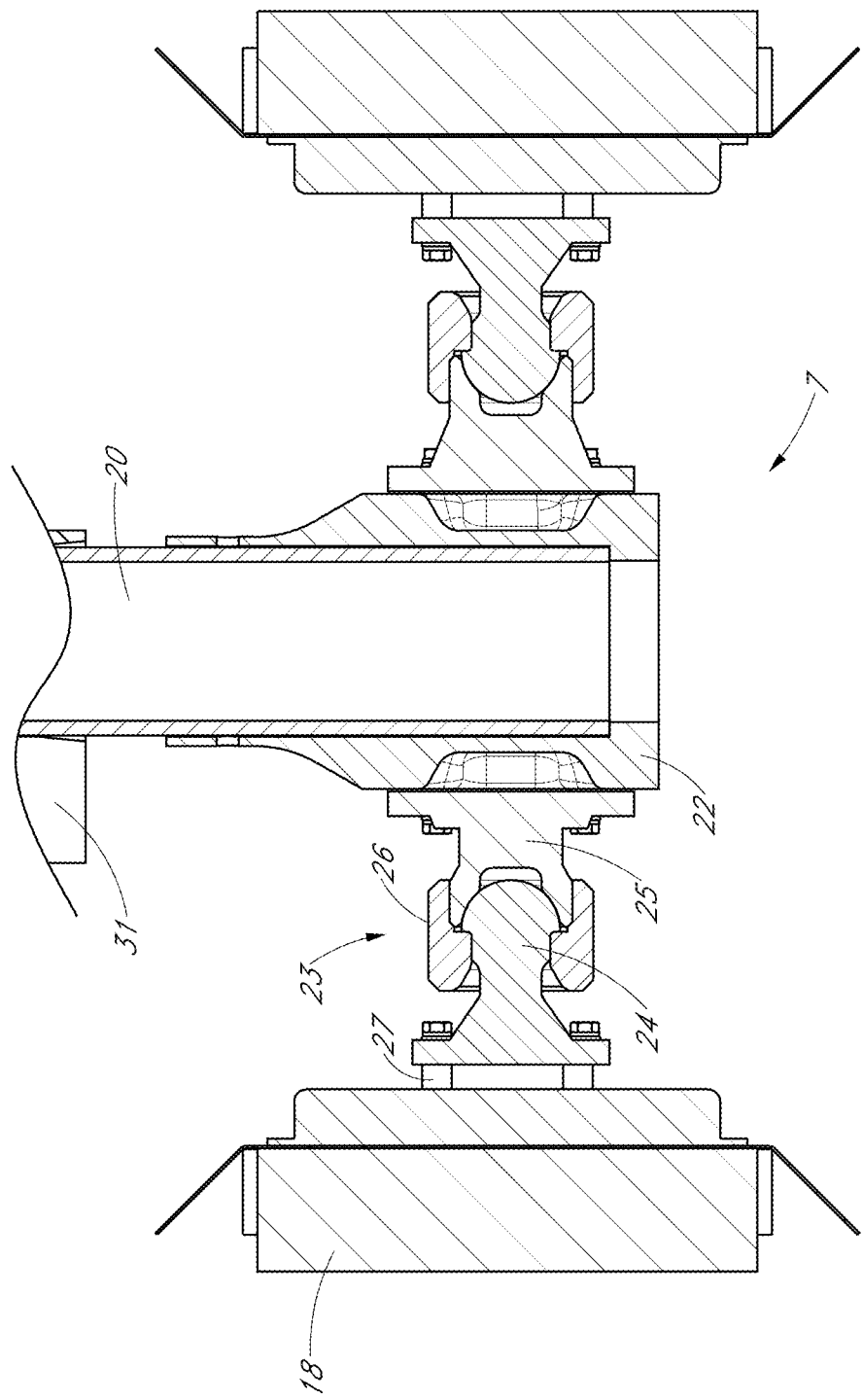
FIG. 10 is a schematic side sectional view of the antenna assembly shown in FIG. 9.

FIG. 9 is a schematic perspective view of the antenna assembly 7 mounted to the arch assembly 1, according to one embodiment. FIG. 10 is a schematic side sectional view of the antenna assembly 7 shown in FIG. 9. The antenna assembly 7 can comprise an antenna 18 configured to receive and/or transmit electromagnetic signals across a desired bandwidth of frequencies. A mounting plate 31 can mechanically connect to the arch assembly 1 by way of one or more fasteners 19. As shown in FIGS. 9-10, the mounting plate 31 can comprise an internal channel sized and shaped to receive a rod member 20. One or more fasteners 21 can be used to tighten the mounting plate 31 about the rod member 20. In some embodiments, the fasteners 21 can be loosened so as to raise and/or lower the rod member 20 through the channel within the mounting plate 31 to raise and/or lower the antenna 18. A fitting 22 can comprise a wall defining an internal channel, and the fitting 22 can be fastened about the rod member 20. A ball joint assembly 23 can connect the fitting 22 to the antenna 18.

With reference to FIG. 10, the ball joint assembly 23 can include a ball seat 25 connected to the fitting 22 by any suitable fastener or connector, with the wall of the fitting 22 disposed between the ball seat 25 and the internal channel. The ball seat 25 can be sized and shaped to receive a ball joint 24. For example, the ball seat 25 can have a curved surface that can accommodate a generally spherical surface of the ball joint 24. A nut 26 can laterally secure the ball joint 24 to the ball seat 25 such that the ball joint 24 does not laterally separate from the ball seat 25. In various embodiments, for example, the nut 26 can be threaded, snapped, or otherwise coupled onto the ball seat 25. The nut 26 can comprise a shoulder that retains the ball joint 24 within the ball seat 25 but that permits the ball joint 24 to rotate within the ball seat 25. The ball joint 24 can connect to the antenna 18 by way of fasteners 27. During installation or operation, the user can loosen the nut 26 to rotate the antenna 18 into a desired orientation. The nut 26 can be tightened to secure the antenna 18 at the desired orientation. It should be appreciated that, although an antenna assembly 7 is the electrical device that is mounted to the arch assembly 1 in FIGS. 9-10, in other embodiments, other types of devices may be mounted to the arch assembly 1 in a similar manner.

As with various other components of the arch assembly, any or all of the mounting plate 31, the fitting 22, the ball seat 25, the ball joint 24, and the nut 26 may be formed using a 3D printing technique, or other manufacturing process that creates a monolithic or unitary structure without seams or joints. The ball joint 24 can provide a rotatable fitting that can be laterally secured (for example, by the nut 26). The ball joint 24 can be easily rotated or repositioned by the user without the need for any spare nuts or bolts, other than the nut 26 provided over the ball joint 24. Such techniques can efficiently create complex shapes, such as the spherical profile of the ball joint 24, the complementary curved surface of the ball seat 25, the nut 26 with internal recesses (and possibly threads), and the fitting 22 and mounting plate 31 with internal channels to receive the rod member 20. Furthermore, these components can be made with relatively lightweight materials (such as polymeric materials), which can improve the mobility of the arch member 1.

Figure 11:
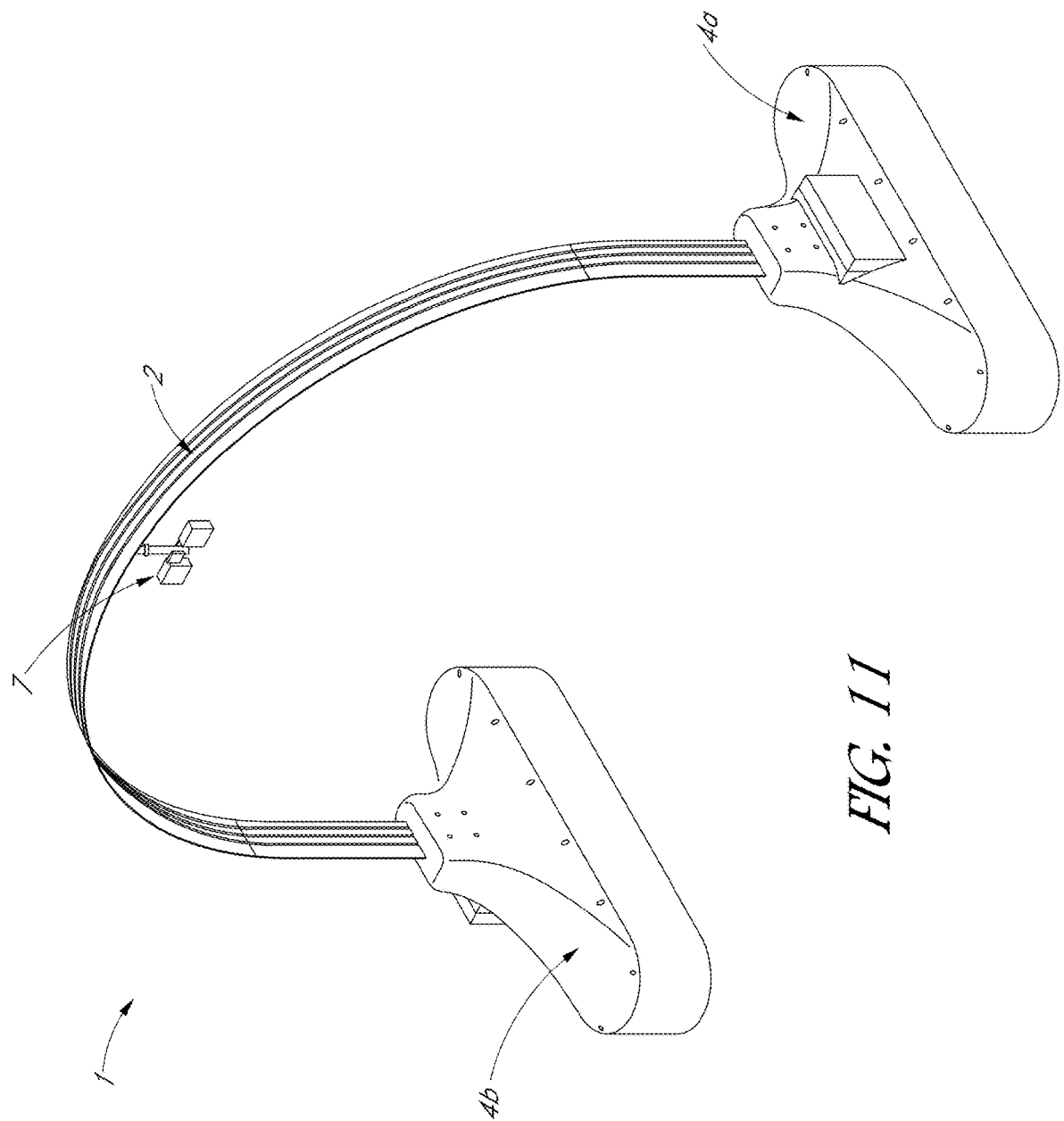
FIG. 11 is a schematic perspective view of an arch assembly according to another embodiment.
Figure 12:
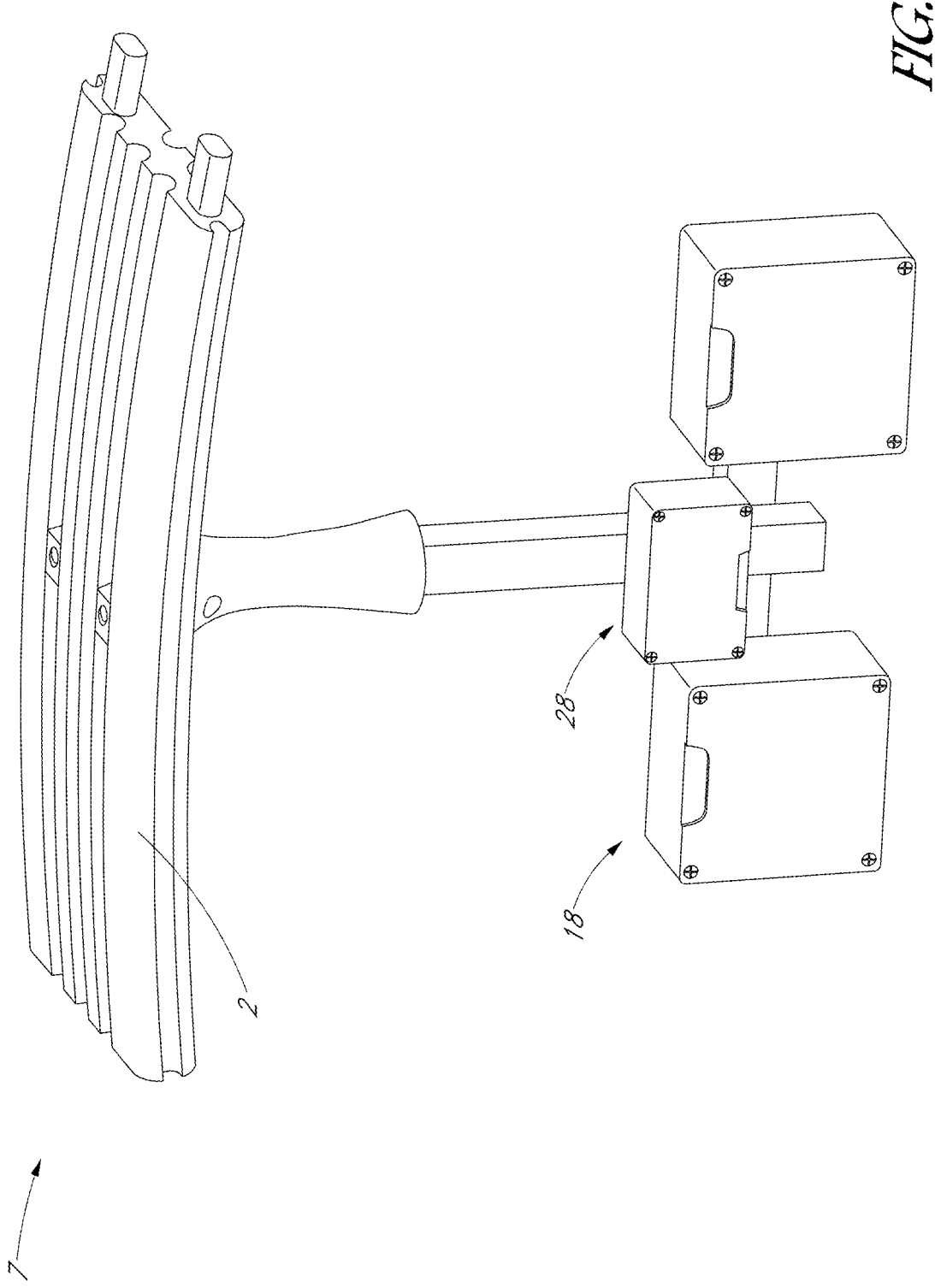
FIG. 12 is a schematic view of the antenna assembly shown in FIG. 11.

FIG. 11 is a schematic perspective view of an arch assembly 1 according to another embodiment. FIG. 12 is a schematic view of the antenna assembly 7 shown in FIG. 11. Unless otherwise noted, reference numerals in FIGS. 11 and 12 represent components that are the same as or similar to the components of FIGS. 1-10. For example, as shown in FIG. 11, the arch assembly 1 can include an arch member 2 connected to two anchor assemblies 4a, 4b on opposite sides of railroad tracks. In the embodiment of FIG. 11, however, fewer arch members 2 may be used as compared with the embodiment of FIGS. 1-10. Furthermore, in FIG. 11, the anchor assemblies 4a, 4b can have a larger footprint, as compared with the anchor assemblies 4a, 4b of FIGS. 1-10, which may improve the assembly's resistance to overturning moments. Processing electronics 28 may be disposed adjacent the antenna 18 in some embodiments. The processing electronics 28 can be configured to pre-process signals received by or transmitted from the antenna 18.

Figure 13B:
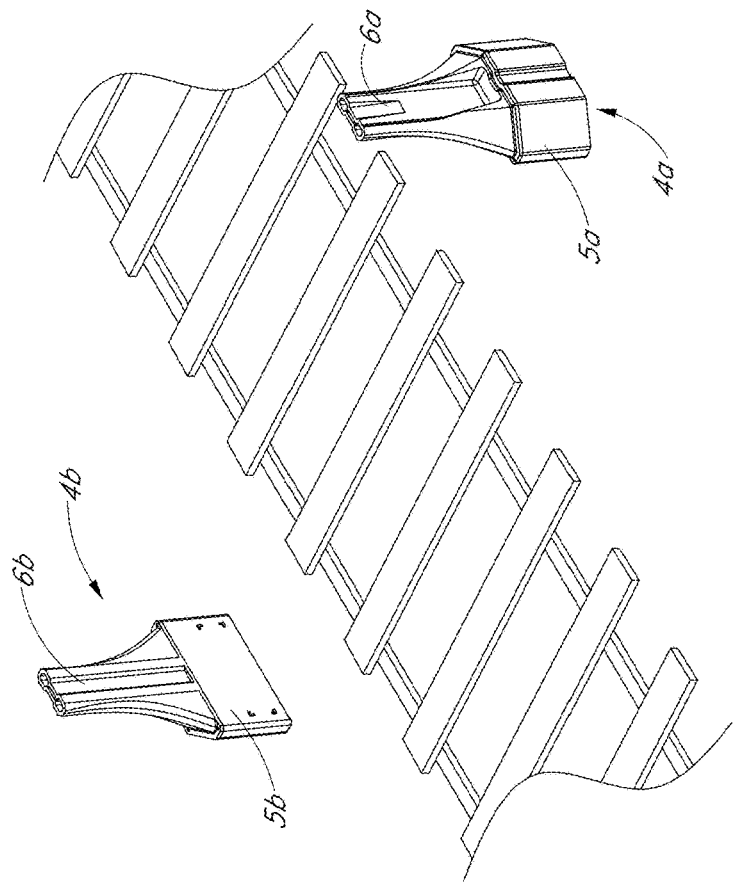
FIG. 13B is a schematic perspective view of an anchor assembly after caps have been connected to the anchors.
Figure 13A:
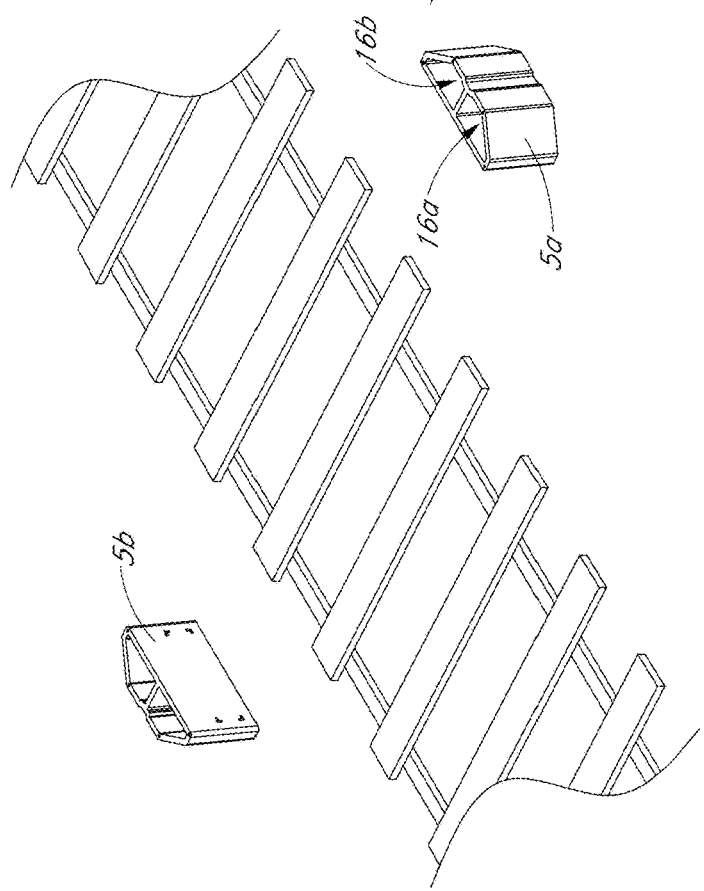
FIG. 13A is a schematic perspective view of anchors of the arch assembly of FIG. 1 after the anchors have be placed on the ground or other support surface.

FIGS. 13A-13D schematically illustrate a method for installing the arch assembly 1 of FIGS. 1-10, according to various embodiments. In FIG. 13A, to install the arch assembly 1, the installer can place the anchors 5a, 5b on opposing sides of the railroad tracks, spaced apart approximately by the diameter that the arch subtends. Ballast (e.g., dirt, concrete, etc.) can be provided in the cavities 16a, 16b of the anchors 5a, 5b. As explained above, a sufficient amount of ballast (or in combination with being at least partially buried) can be provided so as to sustain vertical forces and overturning moments imparted to the arch assembly 1. During the step of FIG. 13A, the installers may carry only the empty anchors 5a, 5b to the installation site. Because the anchors 5a, 5b can be made with lightweight materials (e.g., a polymer) using 3D printing or other monolithic manufacturing techniques, the installers can quickly and easily manually transport the anchors 5a, 5b to the installation site.

Figure 13D:
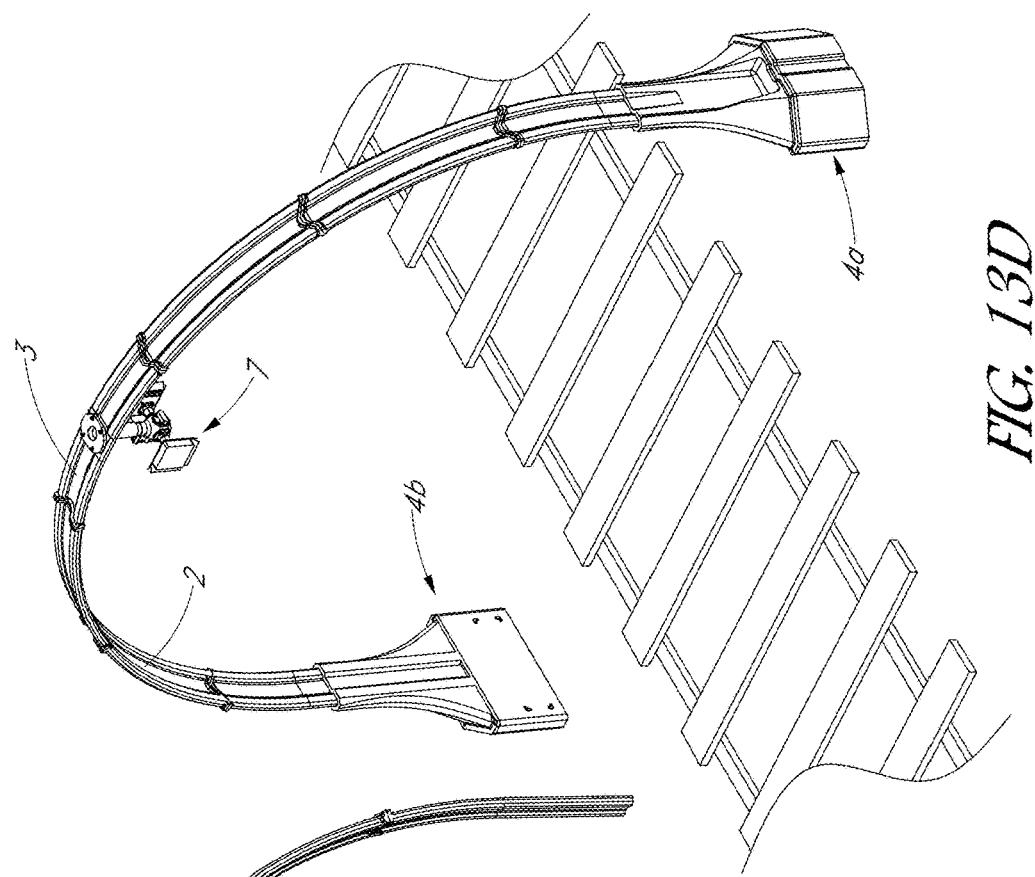
FIG. 13D is a schematic perspective view of the arch assembly after assembly of the arch members of FIG. 13C to the anchors of FIG. 13B.
Figure 13C:
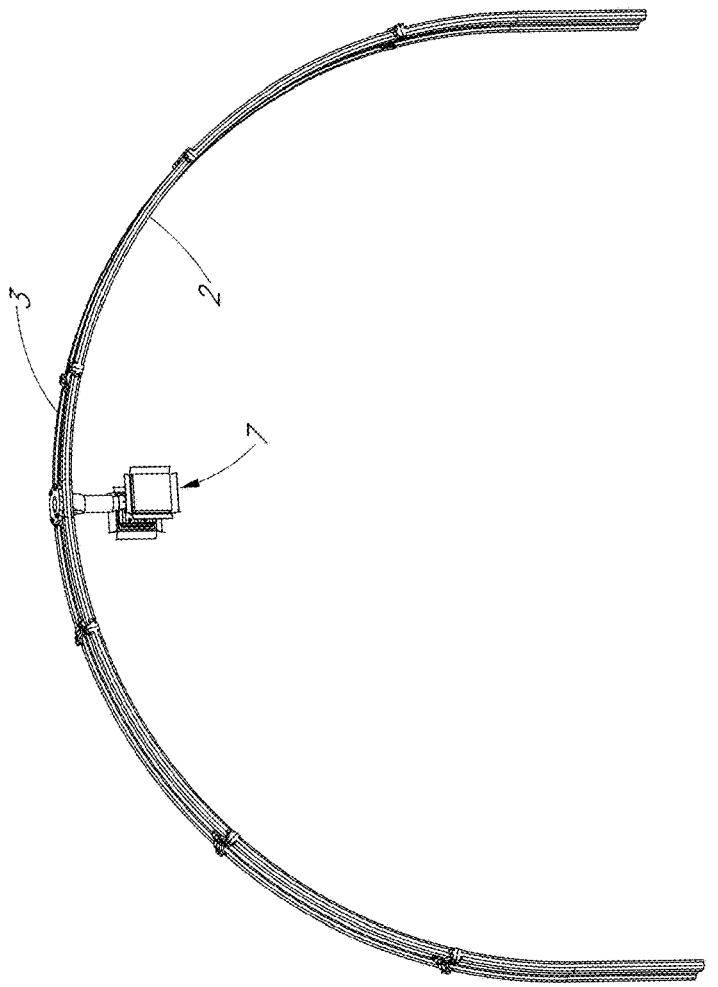
FIG. 13C is a schematic perspective view of a portion of an arch assembly after connecting a plurality of arch members together.

Turning to FIG. 13B, the installers can similarly bring the lightweight caps 6a, 6b to the installation site, and can connect the caps 6a, 6b to the anchors 5a, 5b over the ballast in the cavities 16a, 16b, for example, using any suitable fasteners. In FIG. 13C, the installers can carry a pre-assembled arch comprising a plurality of interconnected arch members 2 to the installation site. Alternatively, the installers can carry separated arch members 2 to the installation site and can connect the arch members 2 at the installation site. Again, because the arch members 2 can be formed of a lightweight material using 3D printing or other monolithic fabrication techniques, and because the arch members 2 can include voids 15 (see FIG. 6 and related description) defined therein, the installers can quickly and easily transport the arch to the installation site. Turning to FIG. 13D, the ends of the arch members 2 can be inserted into corresponding slots 17 (see FIG. 8B) of the anchor assemblies 4a, 4b. Fasteners can be used to connect the arch members 2 to the anchor assemblies 4a, 4b.

Figure 15:
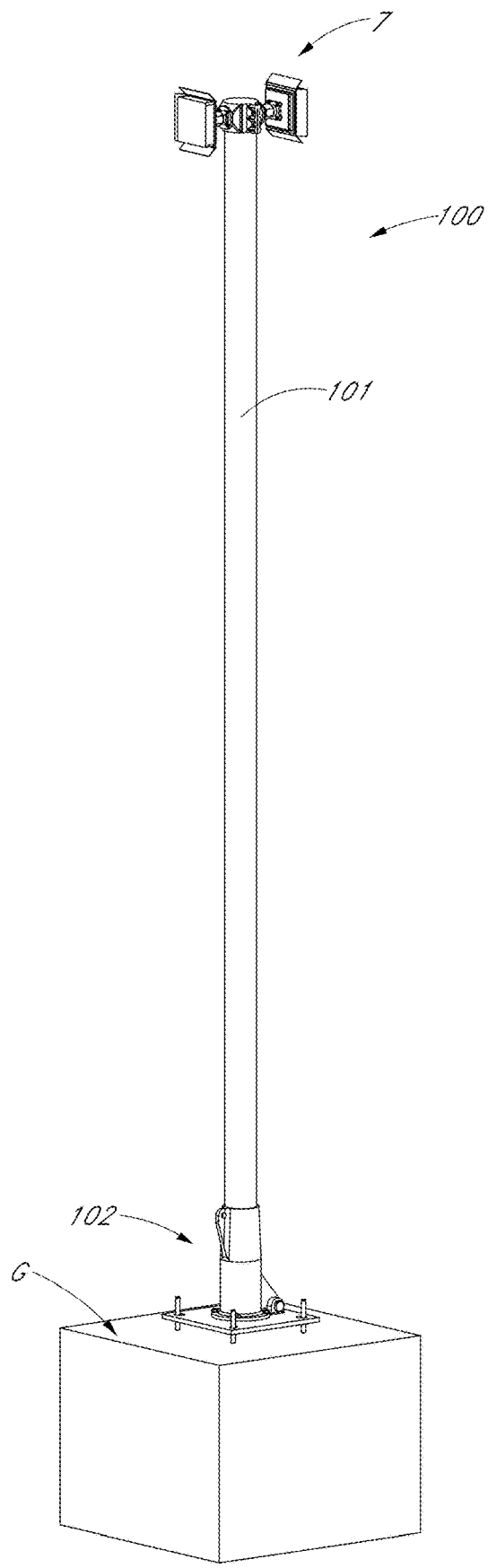
FIG. 15 is a schematic perspective view of the hinged mast assembly of FIG. 14.

FIGS. 14-20 illustrate a support structure that comprises a hinged mast assembly 100, according to various embodiments. FIG. 14 is a schematic side view of a hinged mast assembly 100 in first and second rotational positions, according to one embodiment. FIG. 15 is a schematic perspective view of the hinged mast assembly 100 of FIG. 14. As with the arch assembly 1 described above, the hinged mast assembly 100 can be configured to support a device (e.g., an antenna assembly 7) in a transportation system. The antenna assembly 7 or other devices can electrically communicate with a train as it passes near the mast assembly 100. Unlike the arch assembly 1, in which the antenna assembly 7 may be disposed over the tracks, the hinged mast assembly 100 can be positioned adjacent the tracks and configured to communicate with the train as the train passes by the hinged mast assembly 100.

Figure 16:
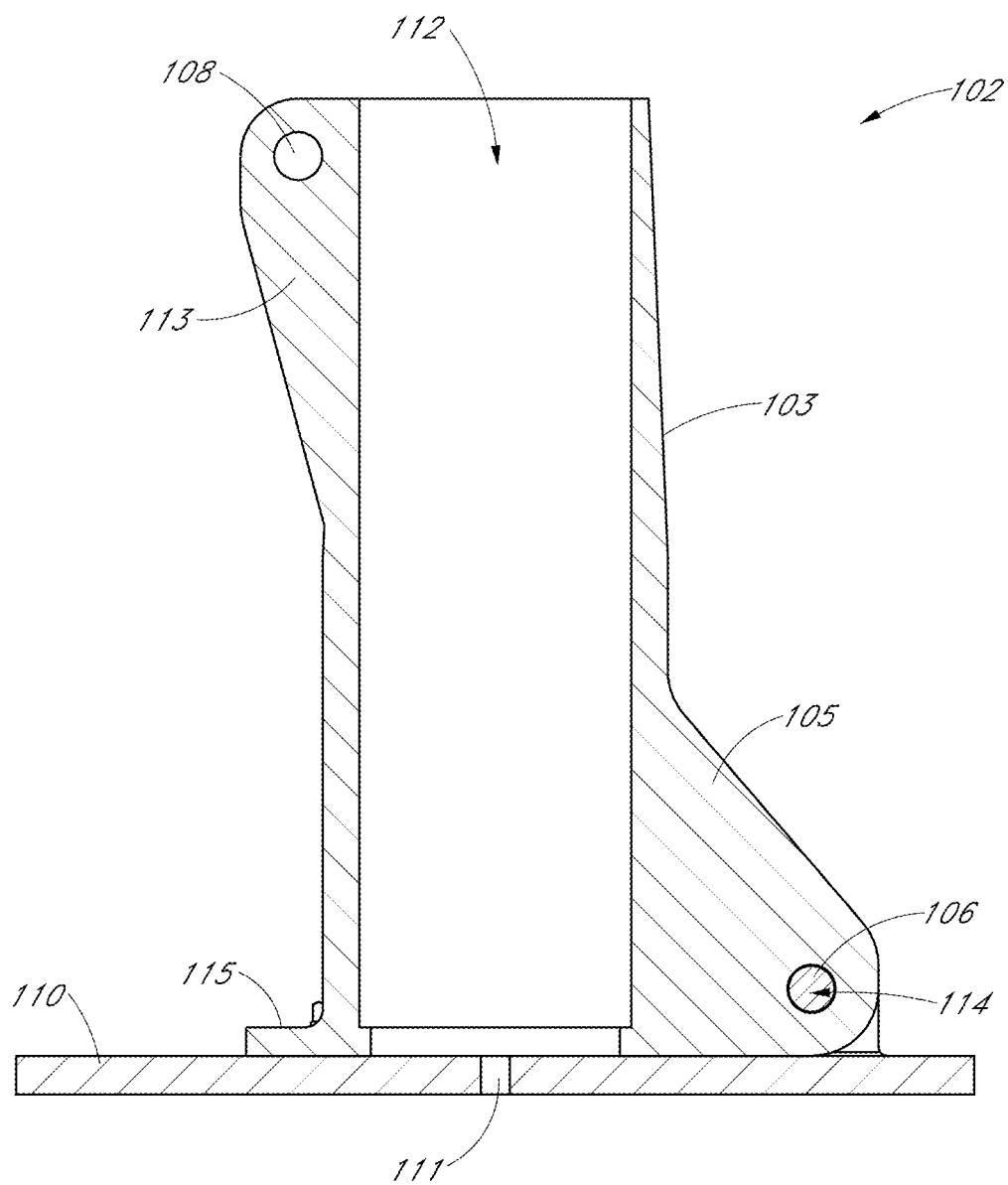
FIG. 16 is a schematic side sectional view of a hinge assembly of the hinged mast assembly of FIG. 14.

The mast assembly 100 of FIGS. 14-15 can include a mast 101 connected to the ground G or other support platform (such as a block of buried concrete) by way of a hinge assembly 102. The antenna assembly 7 can be supported at a distal end of the mast 101 by way of a mounting structure. One or more electrical cable can pass through a channel of the mast 101 to electrically connect the antenna assembly 7 to the computer system of the transportation network. If the cables should need to be replaced, or if the antenna assembly 7 needs to be serviced, it can be challenging to quickly and safely access the cables (which can pass through a bottom surface of the hinge assembly 102 as shown in FIG. 16) and/or the antenna assembly 7. Beneficially, the embodiments disclosed herein enable the mast to be pivoted or rotated about the hinge assembly 102 from a first upright position (Position 1) to a second pivoted position (Position 2) about an angle A, as shown in FIG. 14. Angle A can be in a range of 80° to 90° in various embodiments, e.g., about 85° in one embodiment. In Position 2, the user can access the antenna assembly 7 and/or can conduct maintenance on the cables within the mast 101. Furthermore, because the hinge assembly 102 and/or portions of the antenna assembly 7 can be made of lightweight materials using monolithic fabrication techniques such as 3D printing, the assembly 100 can be relatively easily maneuvered and rotated by the user.

Figure 17:
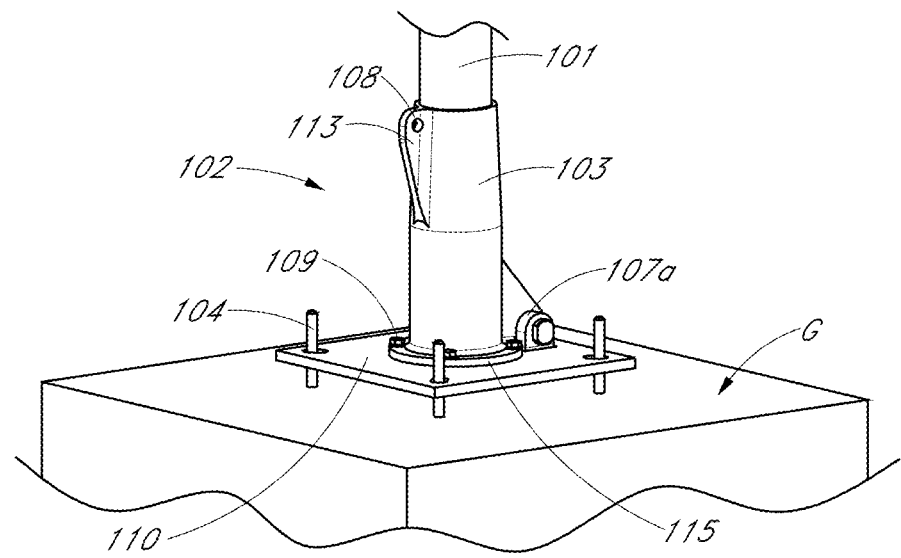
FIG. 17 is a schematic front perspective view of the hinge assembly of FIG. 16 with the mast connected to the hinge assembly.

FIG. 16 is a schematic side sectional view of the hinge assembly 102, according to various embodiments. FIG. 17 is a schematic front perspective view of the hinge assembly 102 with the mast 101 connected to the hinge assembly 102.

Figure 18:
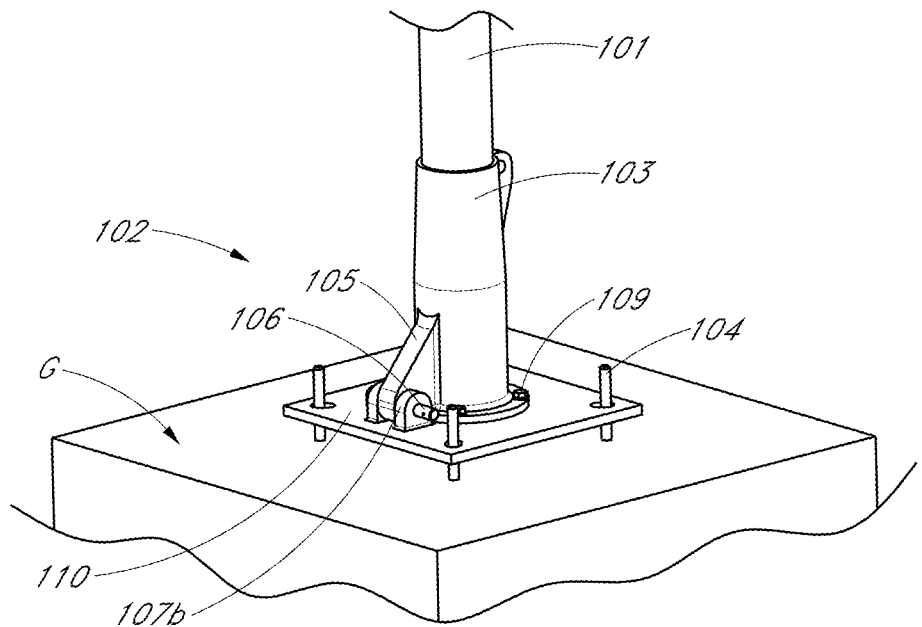
FIG. 18 is a schematic rear perspective view of the hinge assembly of FIG. 17.

FIG. 18 is a schematic rear perspective view of the hinge assembly 102 of FIG. 17. The hinge assembly 102 can comprise an anchor member including a base plate 110 affixed to the ground G or support surface (such as a buried block of concrete) by way of one or more fasteners 104. Two hinge posts 107a, 107b can extend upwardly from the base plate 110. Each hinge post 107a, 107b can comprise respective holes formed therethrough and can be spaced apart from one another. In some embodiments, the base plate 110 can be monolithically formed using a 3D printing technique. In other embodiments, the base plate 110 may not be monolithically formed.

The hinge assembly 102 can further include pivot member comprising a receiver body 103 having an inner wall that defines a receiver chamber 112 sized and shaped to receive the mast 101. The mast 101 can be inserted into the receiver chamber 112, with the inner wall of the receiver body 103 supporting the mast 101. A hinge element 105 can extend radially outward from the outer wall of the receiver body 103. The hinge element 105 can comprise a hole 114 formed through a distal portion of the hinge element 105. The hinge element 105 can have a thickness sized and shaped such that the hinge element 105 can be inserted between the opposing hinge posts 107a, 107b. A pin 106 can be inserted through the holes in the hinge posts 107a, 107b and the hole 114 in the hinge element 105. A clip or other device (not shown) can be provided at one end of the pin to prevent the pin from sliding out of the holes.

As shown in FIG. 16, the base plate 110 can comprise a cable aperture 111 sized such that the electrical cables (not shown) connected to the antenna assembly 7 can pass through the aperture 111 and into the conduits in the ground or other support structure. The receiver body 103 can comprise a flange 115 at a bottom end of the receiver body 103 disposed circumferentially about the outer wall of the receiver body 103. One or more connectors 109 to connect the flange 115 of the receiver body 103 to the base plate 110. The connectors 109 can comprise any suitable removable connector, such as screws, bolts, or any other suitable connector or fastener. The connectors 109 can be fastened tightly against the flange 115 when the hinged mast assembly 100 is in the upright position (Position 1).

It can be challenging to fix or replace the cables that pass through the aperture 111, since the aperture 111 faces the ground G. Further, it can be challenging to conduct maintenance on the antenna assembly 7, since the antenna assembly 7 may be disposed high above the ground when in Position 1. Accordingly, in various embodiments disclosed herein, to conduct maintenance on the cables, the antenna assembly 7, or other components, the user can loosen and remove the connectors 109 to disconnect the flange 115 from the base plate 110. The user can then rotate the mast 101 using the hinge assembly 102 such that the hinge element 105 pivots about the pin 106.

The receiver body 103 can further comprise a projection 113 at an upper portion of the receiver body and integrally formed therewith. The projection 113 can extend radially outward from the receiver body 103. The projection 113 can be disposed on an opposite side of the receiver body 103 from the hinge element 105, e.g., directly across from the hinge element 105. For example, the projection 113 can be circumferentially offset from the hinge element 105 in a range of 170° to 190°, or in a range of 175° to 185°, e.g., about 180° in one embodiment. The projection 113 can comprise a hole 108 therein. In various embodiments, the hole 108 in the projection 113 can be used to pivot the mast 101 from the pivoted Position 2 to the upright Position 1 (see FIG. 14), for example, by passing a rope or cable through the hole 108 and pulling the mast 101 to the upright Position 1 (e.g., with a winch). Disposing the projection 113 directly opposite to the hinge element 105 can facilitate rotation into the upright position, such that the pulling motion on the projection 113 is generally transverse to the pivot axis.

Any of all the components of the hinge assembly 102 can be formed using a monolithic fabrication technique, such as 3D printing. As with the arch assembly 1 above, utilizing lightweight materials (such as a polymer) with 3D printing techniques can create lightweight, structurally robust structures that facilitate efficient installation and/or maintenance procedures.

Figure 19:
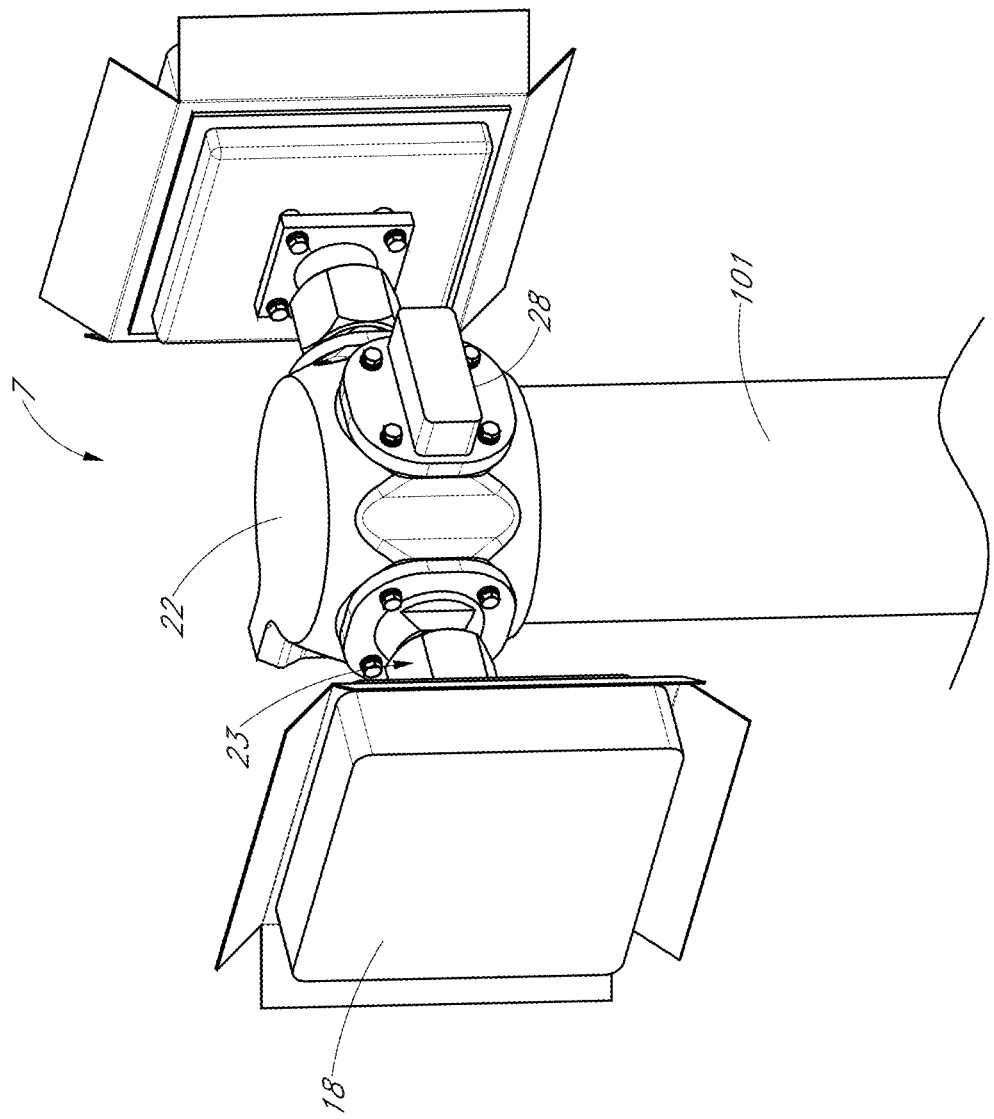
FIG. 19 is a schematic perspective view of an antenna assembly mounted to the mast of FIG. 14.
Figure 20:
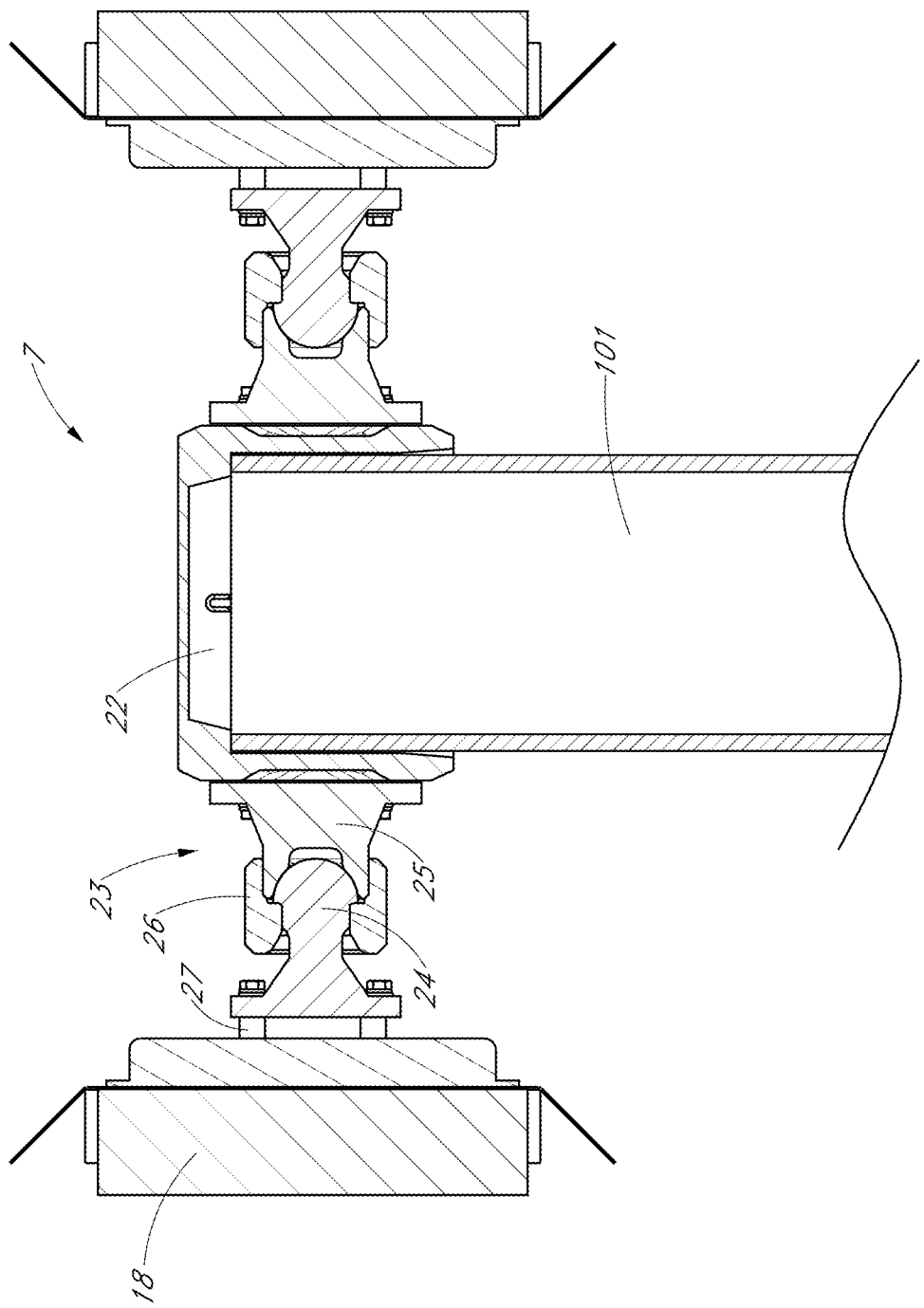
FIG. 20 is a schematic side sectional view of the antenna assembly shown in FIG. 19.

FIG. 19 is a schematic perspective view of the antenna assembly 7 mounted to the mast 101. FIG. 20 is a schematic side sectional view of the antenna assembly 7 shown in FIG. 19. The antenna assembly 7 may be generally similar to the antenna assembly 7 shown in connection with the embodiments of FIGS. 1-13D. For example, the antenna assembly 7 can comprise a fitting 22 connected to the mast 101. The mast 101 can be inserted into a channel of the fitting 22. A ball joint assembly 23 can mechanically couple the antenna 18 to the fitting 22. As with FIGS. 9-10, the ball joint assembly 23 can connect to the antenna 18 with fasteners 27. Further, the ball joint assembly 23 can comprise a ball joint 24 sized and shaped to be rotatably coupled with the ball seat 25. The nut 26 can laterally secure the ball joint 24 to the ball seat 25. As explained above, any or all of the fitting 22, the ball seat 25, the ball joint 24, and the nut 26 may be formed using a monolithic fabrication technique, such as 3D printing. Processing electronics 28 (such as a junction box) can also electrically connect to the antenna 18.

Figure 21:
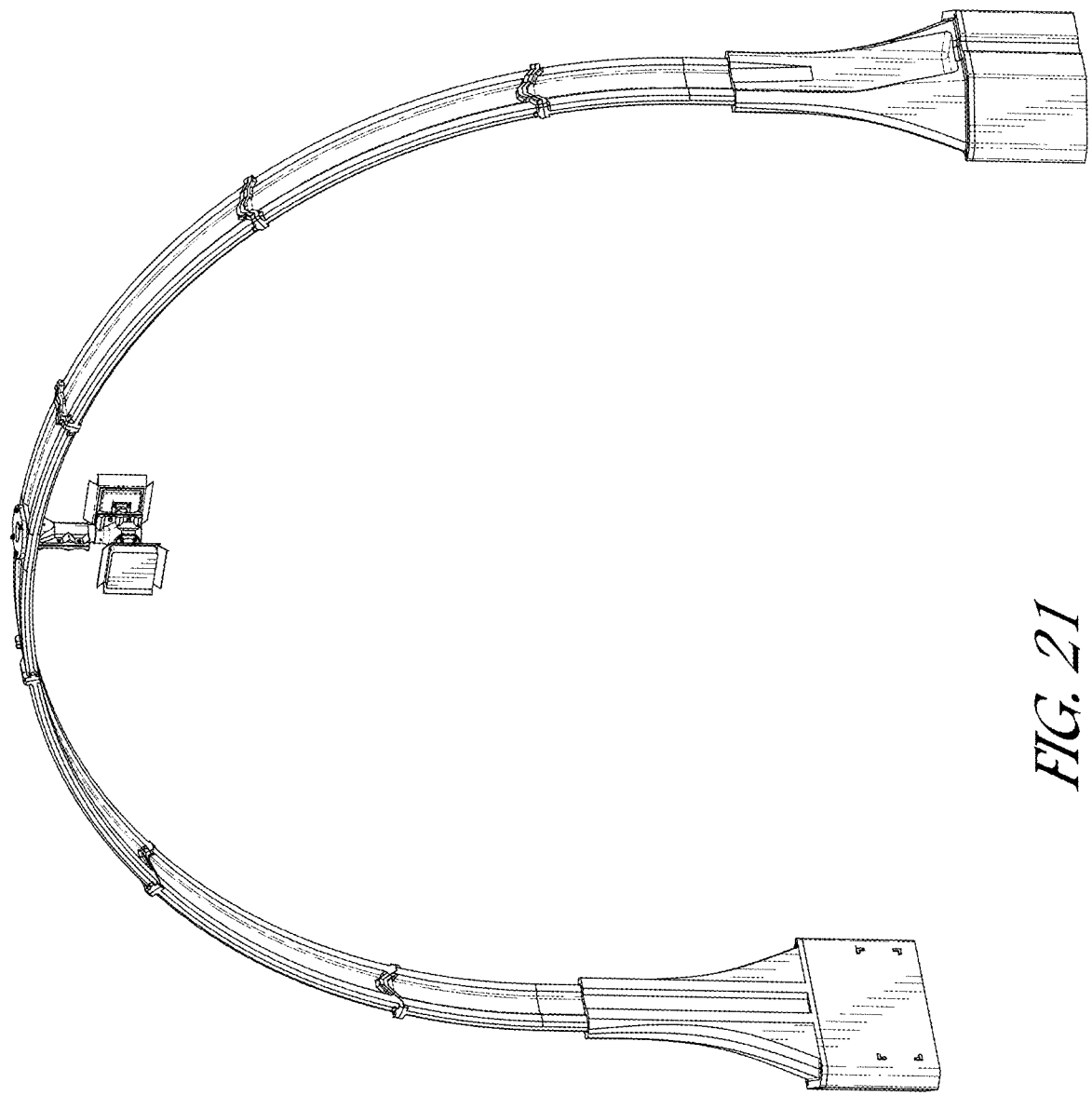
FIG. 21 is a schematic front, right perspective view of an arch assembly, according to one embodiment of the present design.
Figure 22:
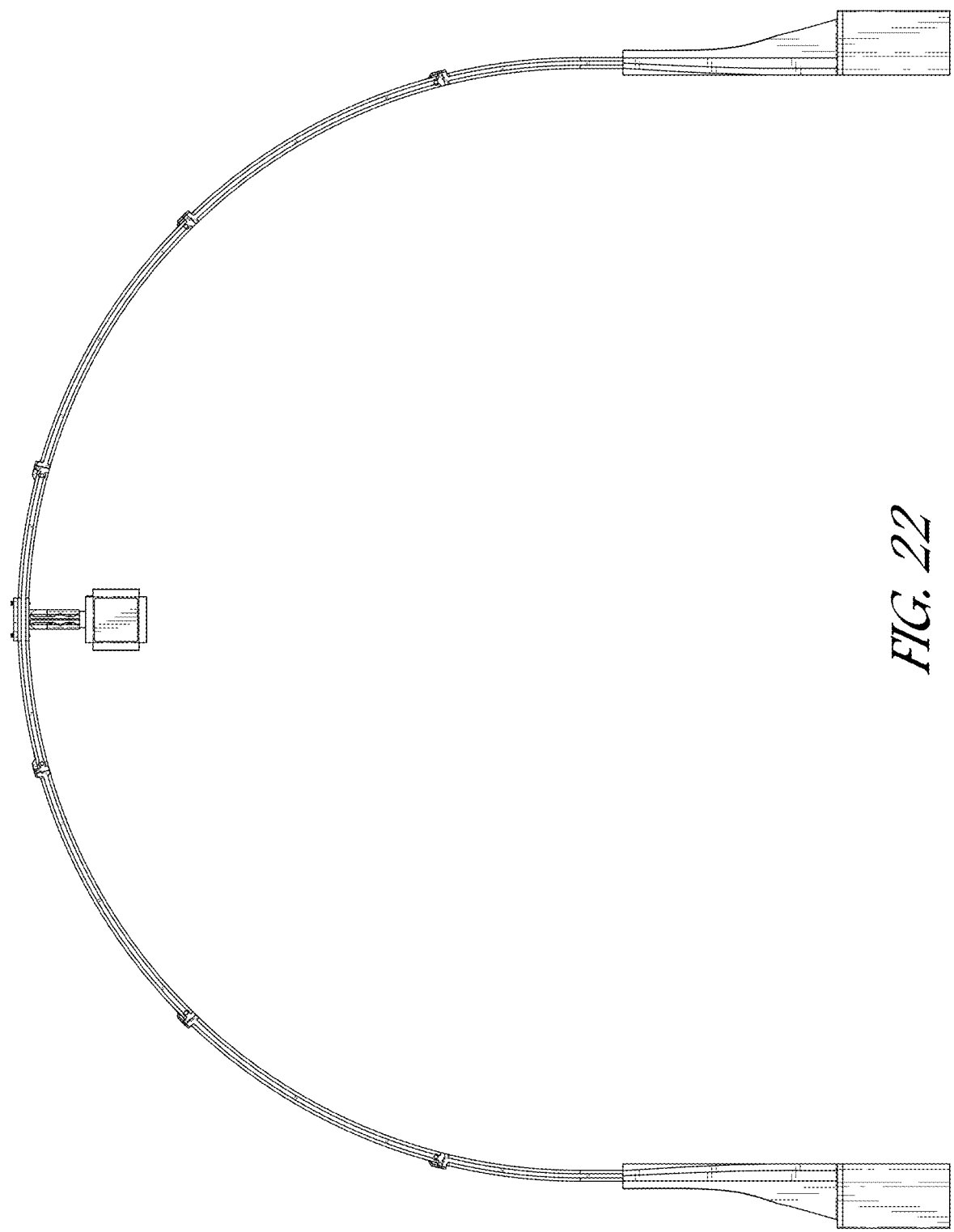
FIG. 22 is a schematic front plan view of the arch assembly of FIG. 21.
Figure 23:
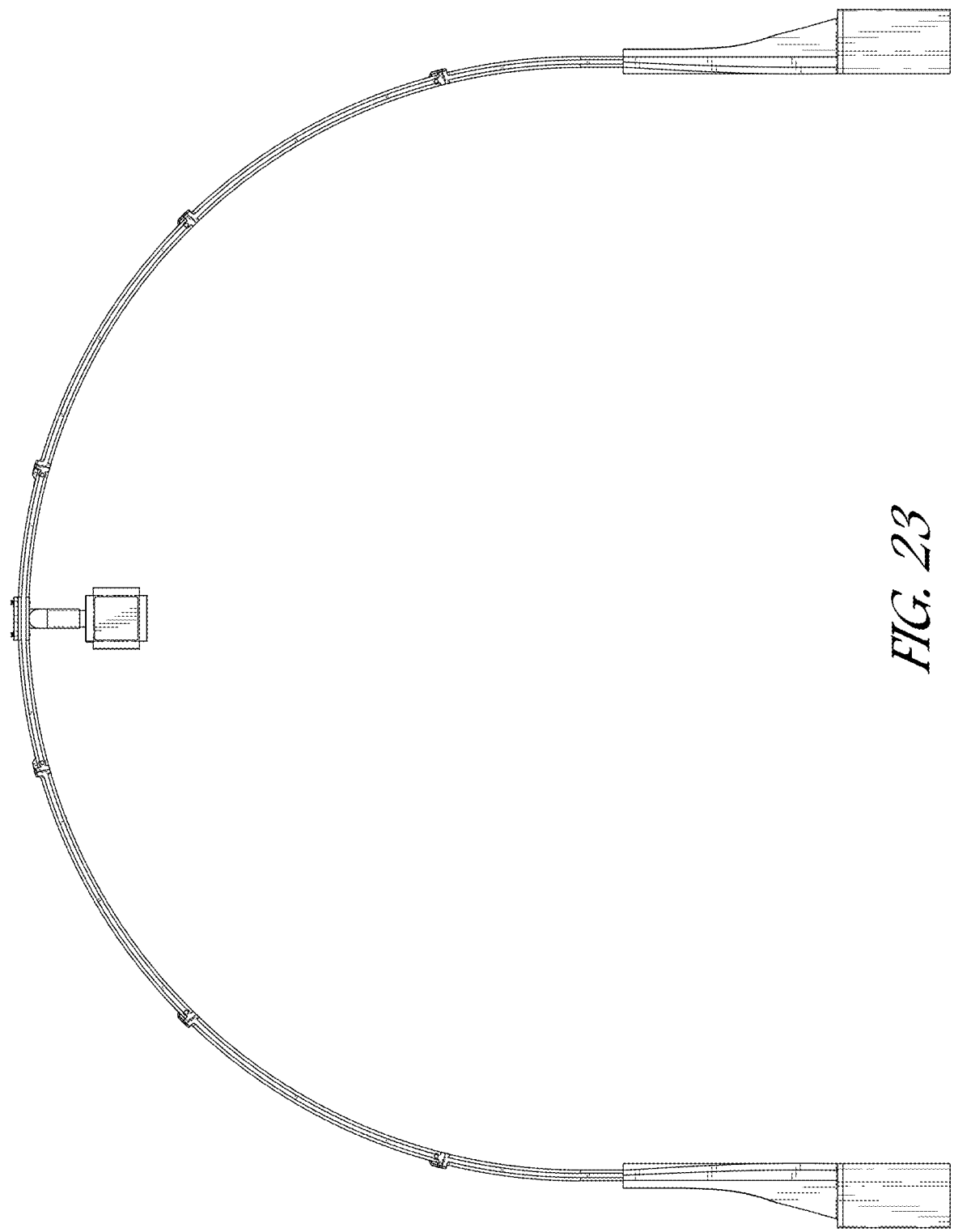
FIG. 23 is a schematic rear plan view of the arch assembly of FIG. 21.
Figure 24:
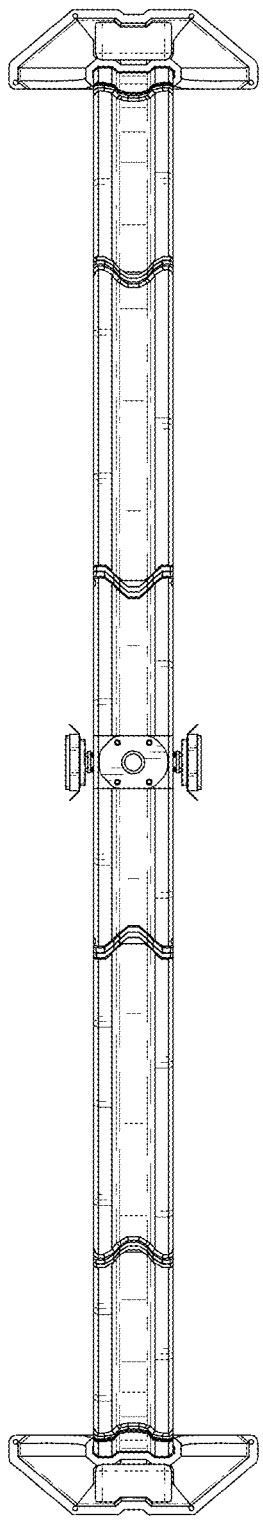
FIG. 24 is a schematic top plan view of the arch assembly of FIG. 21.
Figure 25:
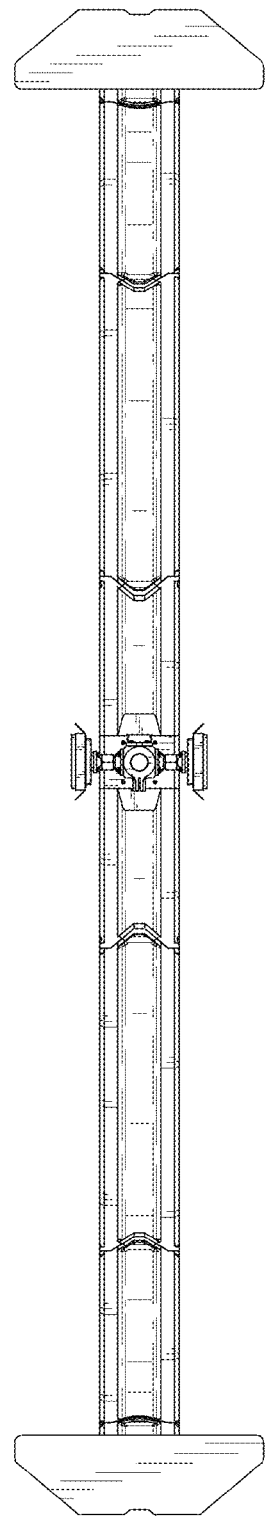
FIG. 25 is a schematic bottom plan view of the arch assembly of FIG. 21.
Figure 27:
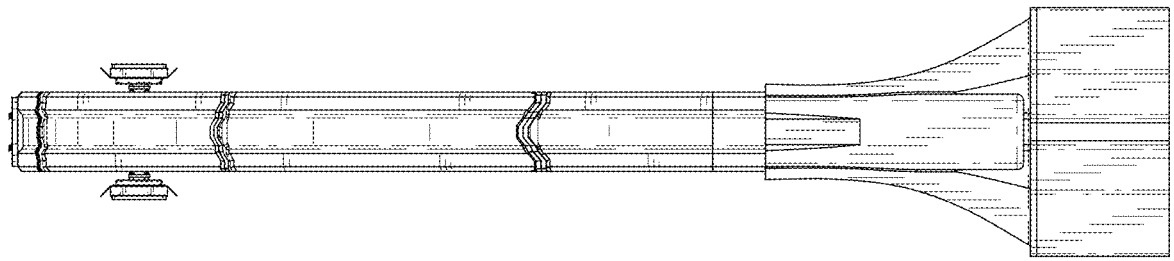
FIG. 27 is a schematic right side view of the arch assembly of FIG. 21.
Figure 26:
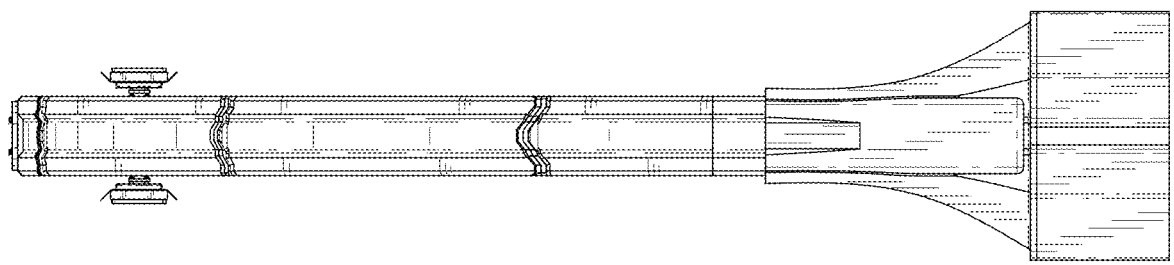
FIG. 26 is a schematic left side view of the arch assembly of FIG. 21.

In various embodiments disclosed herein, we, the inventors, have invented new, original and ornamental designs for an arch assembly. In FIGS. 21-34, the shading shows contours and the broken lines are for illustrative purposes and form no part of the claimed design. FIG. 21 is a schematic front, right perspective view of an arch assembly, according to one embodiment of the present design. FIG. 22 is a schematic front plan view of the arch assembly of FIG. 21. FIG. 23 is a schematic rear plan view of the arch assembly of FIG. 21. FIG. 24 is a schematic top plan view of the arch assembly of FIG. 21. FIG. 25 is a schematic bottom plan view of the arch assembly of FIG. 21. FIG. 26 is a schematic left side view of the arch assembly of FIG. 21. FIG. 27 is a schematic right side view of the arch assembly of FIG. 21.

Figure 28:
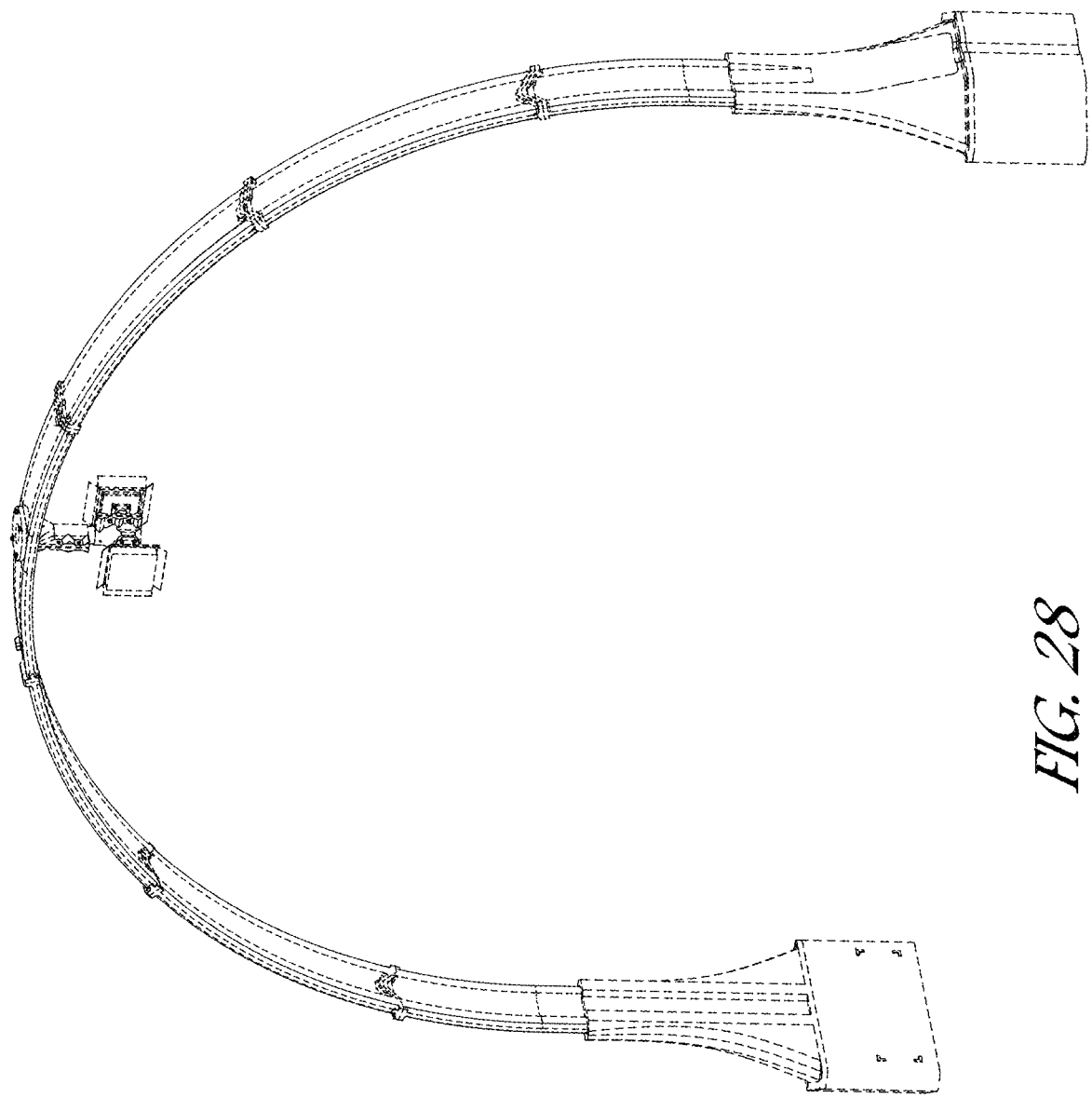
FIG. 28 is a schematic front, right perspective view of an arch assembly, according to another embodiment of the present design.
Figure 29:
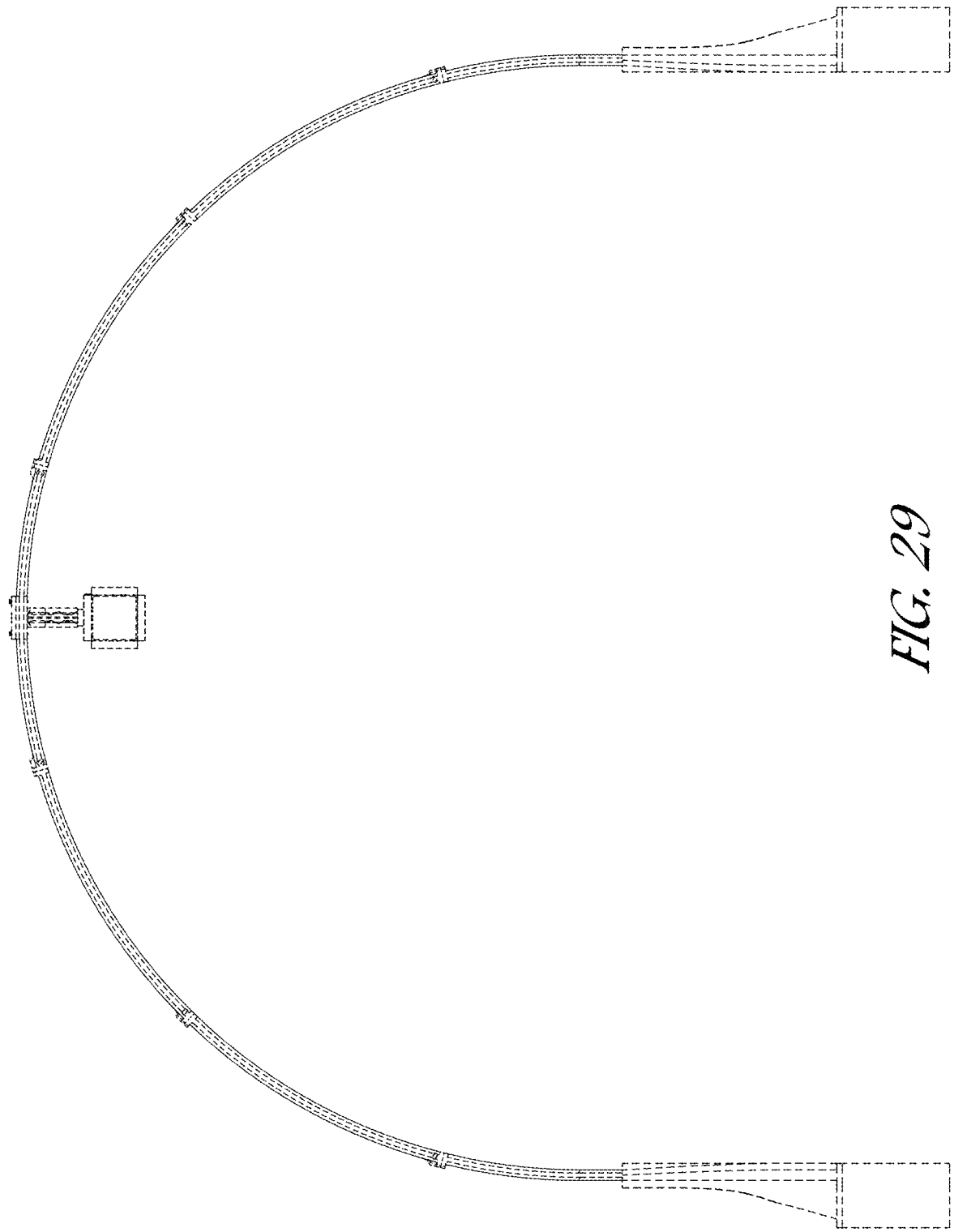
FIG. 29 is a schematic front plan view of the arch assembly of FIG. 28.
Figure 30:
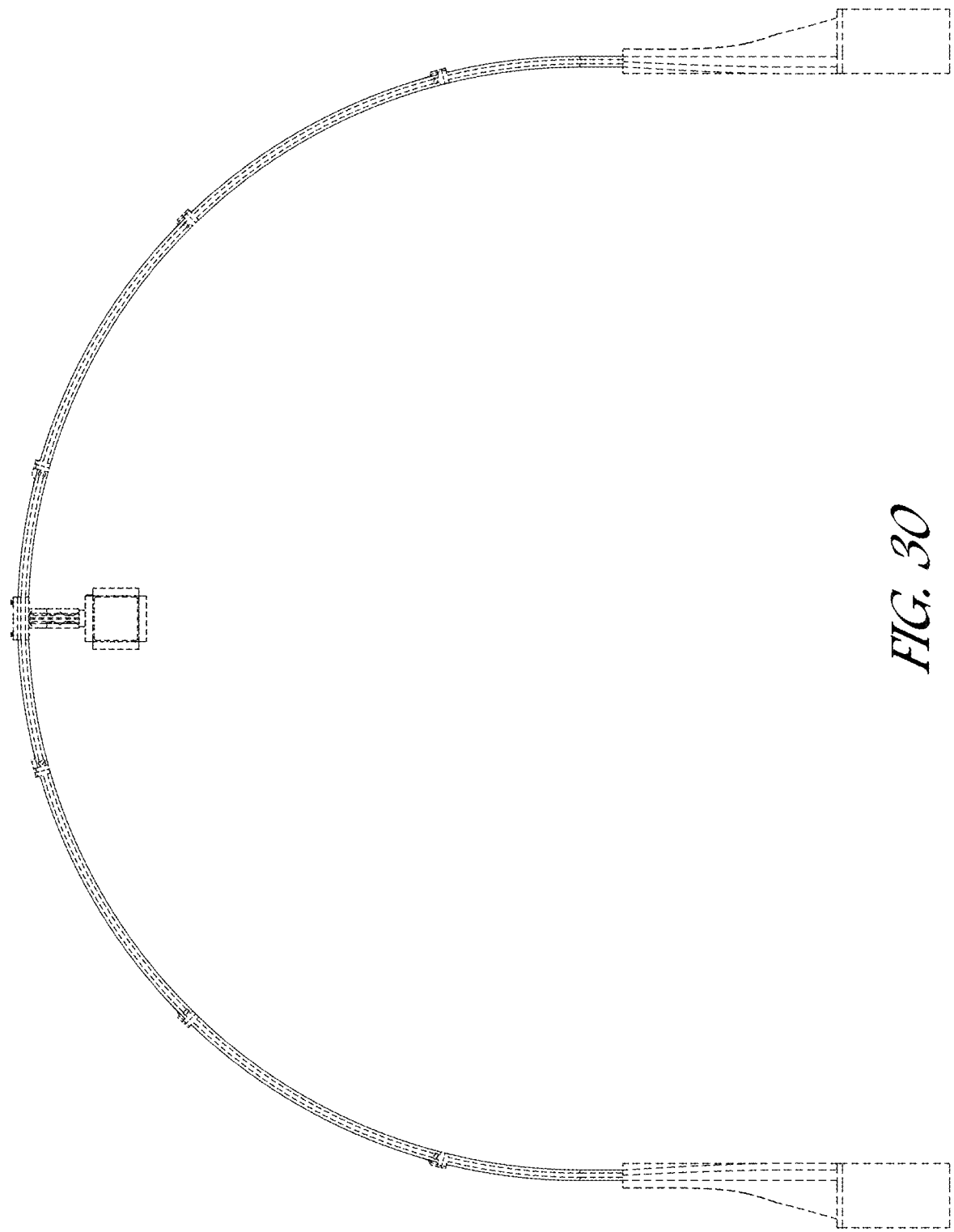
FIG. 30 is a schematic rear plan view of the arch assembly of FIG. 28.
Figure 31:
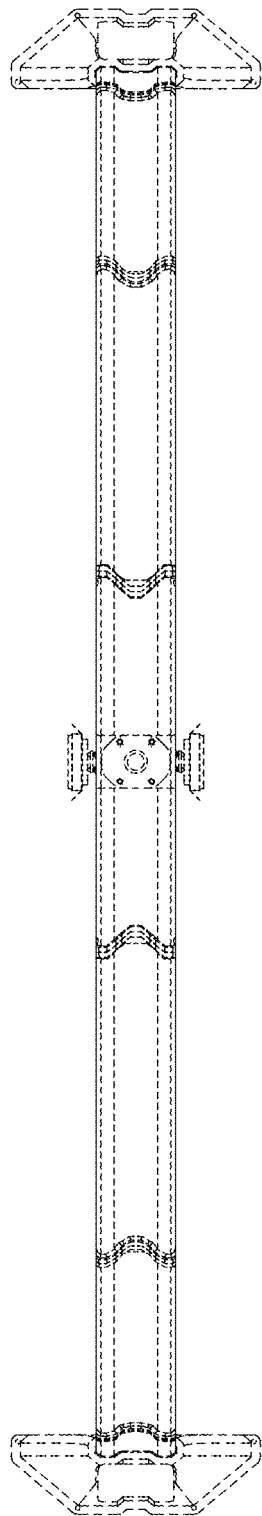
FIG. 31 is a schematic top plan view of the arch assembly of FIG. 28.
Figure 32:
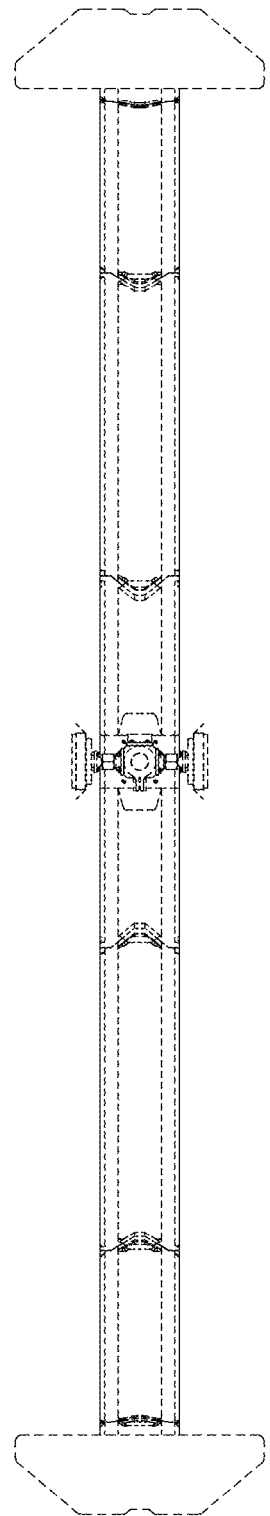
FIG. 32 is a schematic bottom plan view of the arch assembly of FIG. 28.
Figure 34:
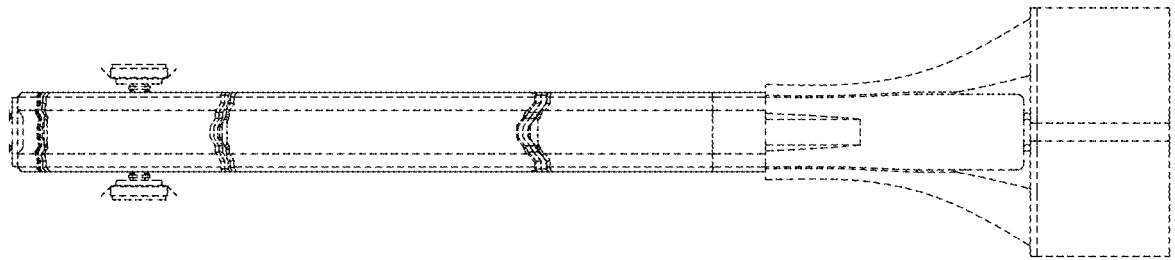
FIG. 34 is a schematic right side view of the arch assembly of FIG. 28.
Figure 33:
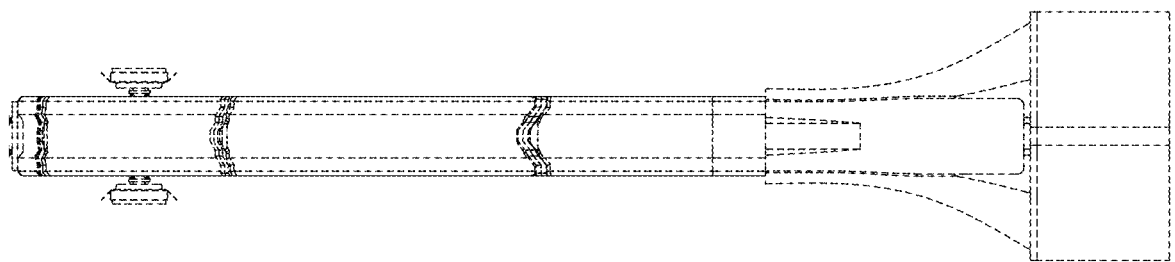
FIG. 33 is a schematic left side view of the arch assembly of FIG. 28.

FIG. 28 is a schematic front, right perspective view of an arch assembly, according to another embodiment of the present design. FIG. 29 is a schematic front plan view of the arch assembly of FIG. 28. FIG. 30 is a schematic rear plan view of the arch assembly of FIG. 28. FIG. 31 is a schematic top plan view of the arch assembly of FIG. 28. FIG. 32 is a schematic bottom plan view of the arch assembly of FIG. 28. FIG. 33 is a schematic left side view of the arch assembly of FIG. 28. FIG. 34 is a schematic right side view of the arch assembly of FIG. 28.

Various embodiments are accordingly directed to the ornamental designs for an arch assembly, as shown and described herein, including at least in FIGS. 21-34.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A support structure comprising:
a self-supporting arch assembly comprising an arch having a curved surface extending from a first end to a second end, the self-supporting arch assembly configured to support one or more devices in a transportation system,
wherein the arch assembly comprises a plurality of arch members mechanically connected to one another by a plurality of joints disposed between adjacent arch members, the plurality of mechanically connected arch members cooperating to form the curved surface of the arch, and
wherein each arch member of the plurality of arch members comprises a seamless, monolithic structure.

2. The support structure of claim 1, further comprising a first anchor and a second anchor, the arch assembly mechanically supported by the first and second anchors.

3. The support structure of claim 2, wherein the first and second anchors comprise respective first and second cavities configured to receive ballast therein.

4. The support structure of claim 3, wherein the first and second anchors are configured to sit atop the ground without any intervening connectors or adhesives.

5. The support structure of claim 3, wherein the first and second cavities receive sufficient ballast to resist overturning moments and vertical forces imparted to the support structure.

6. The support structure of claim 3, further comprising a first cap configured to engage the first anchor over the first cavity and a second cap configured to engage the second anchor over the second cavity.

7. The support structure of claim 6, wherein at least one of the first anchor, the first cap, the second anchor, and the second cap are formed by a three-dimensional (3D) printing technique.

8. The support structure of claim 1, wherein each arch member of the plurality of arch members comprises a three-dimensionally (3D) printed member.

9. The support structure of claim 1, wherein each arch member of the plurality of arch members comprises one or more truss patterns comprising a plurality of interconnected webs with voids disposed between the interconnected webs.

10. The support structure of claim 1, wherein a thickness of each arch member of the plurality of arch members varies along a cross section taken perpendicular to a width of the arch member.

11. The support structure of claim 1, wherein the arch assembly comprises a diameter greater than 3 meters.

12. The support structure of claim 1, wherein a thickness of the arch assembly is less than about 100 mm.

13. The support structure of claim 1, wherein the arch assembly comprises a plastic material.

14. The support structure of claim 1, wherein each arch member of the plurality of arch members is curved.

15. A support structure comprising a self-supporting arch assembly, the self-supporting arch assembly configured to support one or more devices in a transportation system,
wherein the arch assembly comprises a plurality of arch members mechanically connected to one another by a plurality of joints disposed between adjacent arch members,
wherein multiple arch members of the plurality of arch members each has a first end and a second end, the first end having a first engagement feature and the second end having a second engagement feature different from and complementary to the first engagement feature, wherein the first engagement feature comprises a protruding surface and the second engagement feature comprises a recessed surface, wherein a first opening is provided through the first engagement feature and a second opening is provided through the second engagement feature such that the first and second openings are aligned when the protruding and recessed surfaces are engaged.

16. The support structure of claim 15, wherein each arch member of the plurality of arch members comprises a seamless, monolithic structure.

17. The support structure of claim 15, wherein each arch member of the plurality of arch members comprises one or more truss patterns comprising a plurality of interconnected webs with voids disposed between the interconnected webs.

18. The support structure of claim 15, further comprising a first arch member connected to a first anchor and a second arch member connected to a second anchor, the plurality of arch members disposed between the first and second arch members.

19. The support structure of claim 15, wherein the protruding surface is oriented to protrude toward a neighboring arch member of the plurality of arch members.

20. A support structure configured to support one or more devices in a transportation system, the support structure comprising:
a base plate;
a receiver body comprising:
an inner wall that defines a receiver chamber sized and shaped to receive a mast that supports the one or more devices;
a hinge element extending radially outward from an outer wall of the receiver body, the hinge element pivotally connected to the base plate; and
a flange at a lower portion of the receiver body, the flange extending circumferentially about the outer wall of the receiver body, and
one or more fasteners to connect the flange to the base plate,
wherein the receiver body comprises a seamless, monolithic structure.

21. The support structure of claim 20, wherein the receiver body is formed using a three-dimensional (3D) printing process.

22. The support structure of claim 20, further comprising a projection extending radially outward from the outer wall of the receiver body above the hinge element, the projection integrally formed with the receiver body, the projection comprising a hole therethrough.

23. An electrical device mounting assembly configured to mount an electrical device to a support structure in a transportation system, the assembly comprising:
a fitting having a wall that defines an internal channel;
a ball seat mechanically connected to a lateral side surface of the fitting, with the wall of the fitting between the ball seat and the internal channel;
a ball joint received within the ball seat and configured to connect to an electrical device, the ball joint configured to rotate relative to the ball seat;
a nut disposed over the ball joint and connected to the ball seat to laterally constrain the ball joint relative to the balls seat,
wherein one or more of the fitting, the ball seat, the ball joint, and the nut are seamless, monolithic bodies formed using a three-dimensional (3D) printing process.

24. The electrical device mounting assembly of claim 23, further comprising a support structure that positions the electrical device to communicate with a train in a transportation system, the support structure comprising a self-supporting arch assembly.

* * * * *